United States Patent
Ohtani et al.

(10) Patent No.: US 7,725,548 B2
(45) Date of Patent: May 25, 2010

(54) COMPUTER-READABLE RECORDING MEDIUM RECORDING COMMUNICATION PROGRAMS, COMMUNICATION METHOD AND COMMUNICATION APPARATUS

(75) Inventors: Takeshi Ohtani, Kawasaki (JP); Yuichi Matsuda, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 11/489,363

(22) Filed: Jul. 19, 2006

(65) Prior Publication Data

US 2007/0136422 A1    Jun. 14, 2007

(30) Foreign Application Priority Data

Dec. 14, 2005   (JP)   ............................. 2005-360905

(51) Int. Cl.
G06F 15/16    (2006.01)
(52) U.S. Cl. .................. 709/206; 709/227; 455/414; 370/230
(58) Field of Classification Search .................. 709/206, 709/227; 455/414; 370/230
See application file for complete search history.

(56) References Cited

U.S. PATENT DOCUMENTS 6,587,433 B1 *   7/2003   Borella et al. ................ 370/230
7,171,473 B1 *   1/2007   Eftis et al. ................... 709/227
2003/0045275 A1 *   3/2003   McDonagh et al. ......... 455/414
2005/0089023 A1   4/2005   Barkley et al.
2005/0091435 A1   4/2005   Han et al.

FOREIGN PATENT DOCUMENTS

JP    2001-094671    4/2001
JP    2005-202926    7/2005

* cited by examiner

Primary Examiner—Tammy T Nguyen
(74) Attorney, Agent, or Firm—Greer, Burns & Crain, Ltd.

(57) ABSTRACT

Disclosed are a computer-readable recording medium which records communication programs, communication method and communication apparatus capable of easily performing selection and execution of communication units according to communication units of communication partners. A profile management unit manages specific information including a combination of device type information and user identification information in each communication unit, and user IDs associated with the combined information. An application controller, when a session using any one of communication units is established between users, refers to specific information and associates user IDs with the combined information in the communication unit. A collection unit collects presence information where state information indicating whether communication units are available is associated with the combined information in each communication unit. A presence management unit, when a user ID is specified, refers to presence information and reports presence information to client terminals of users where the session is established.

10 Claims, 23 Drawing Sheets

| USER ID | MEDIA TYPE | MEDIA ID | DESCRIPTION |
|---|---|---|---|
| foo | voip | sip:foo@sip.***.com | SOFTPHONE OF PC1 |
| foo | im | sip:foo@im.***.com | INSTANT MESSAGE OF PC1 |
| foo | voip | sip:12345678@sip.***.com | FIXED PHONE OF ITS SEAT |
| foo | voip | sip:foo@mobile.***.com | MOBILE-PHONE |
| foo | mail | foo@jp.***.com | E-MAIL OF MOBILE-PHONE |
| foo | collabo | foo@pc1 | CLIENT OF PC1 |
| goo | voip | sip:goo@sip.***.com | SOFTPHONE OF PC2 |

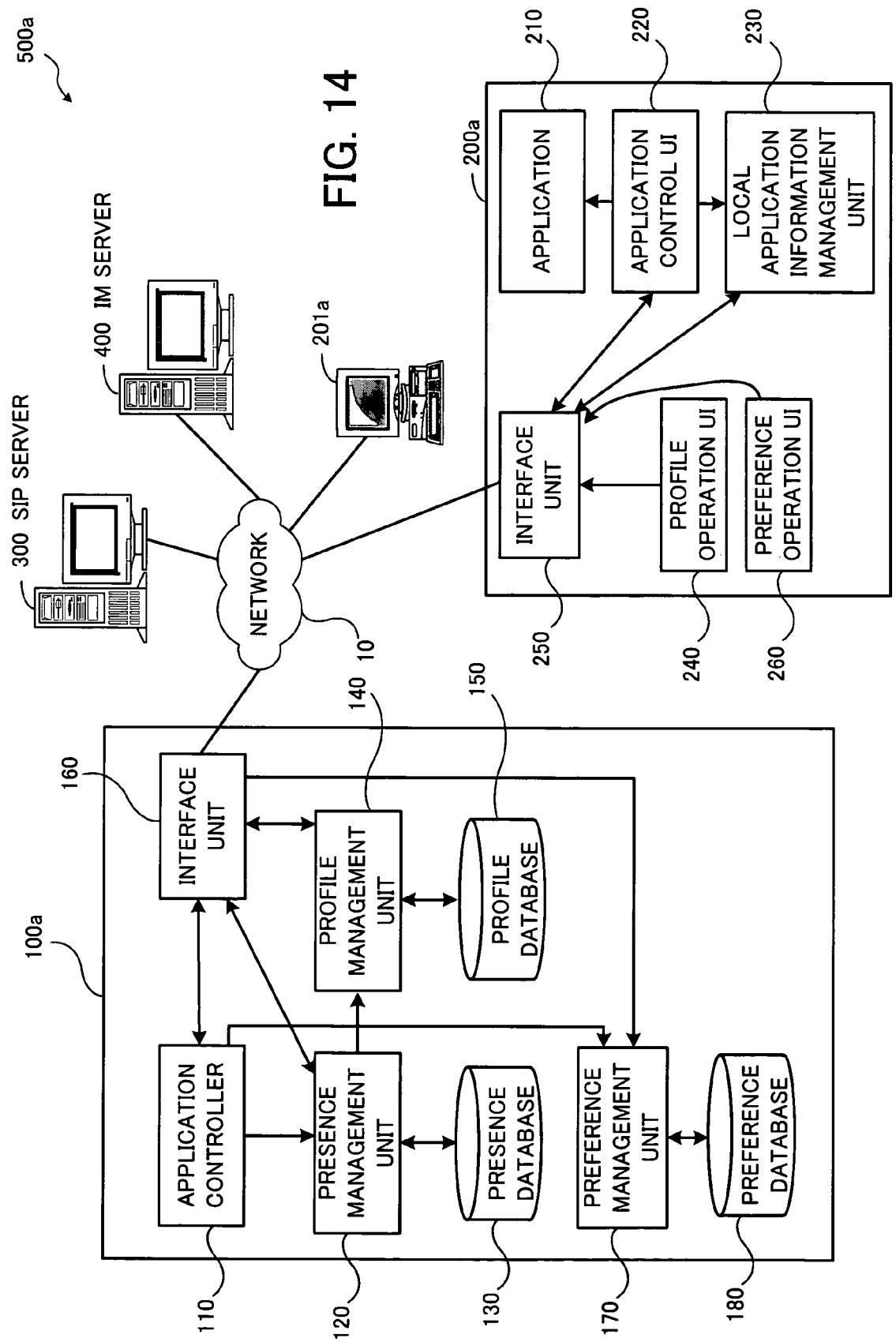

| USER ID | MEDIA TYPE | MEDIA ID | TERMINAL TYPE | POSITION | DESCRIPTION |
|---|---|---|---|---|---|
| foo | voip | sip:foo@sip.***.com | soft | foo@pc1 | SOFTPHONE OF PC1 |
| foo | im | sip:foo@im.***.com | soft | foo@pc1 | INSTANT MESSAGE OF PC1 |
| foo | voip | sip:12345678@sip.***.com | fixed | foo@pc1 | FIXED PHONE OF ITS SEAT |
| foo | voip | sip:foo@mobile.***.com | mobile | – | MOBILE-PHONE |
| foo | mail | sip:foo@sip.*.com | – | sip:foo@mobile.*.com | E-MAIL OF MOBILE-PHONE |
| foo | voip | sip:foo@sip.***.com | soft | foo@pc2 | SOFTPHONE OF PC2 |
| foo | collabo | foo@pc1 | – | – | CLIENT OF PC1 |
| foo | collabo | foo@pc2 | – | – | CLIENT OF PC2 |
| goo | voip | sip:goo@sip.***.com | soft | goo@pc3 | SOFTPHONE OF PC3 |

| USER ID | PREFERENCE |
|---|---|
| foo | mobole,fixed,soft |
| goo | fixed,mobile,soft |

COMPUTER-READABLE RECORDING MEDIUM RECORDING COMMUNICATION PROGRAMS, COMMUNICATION METHOD AND COMMUNICATION APPARATUS

CROSS-REFERENCE TO RELATED APPLICATIONS

This application is based upon and claims the benefits of priority from the prior Japanese Patent Application No. 2005-360905, filed Dec. 14, 2005, the entire contents of which are incorporated herein by reference.

BACKGROUND OF THE INVENTION

1. Field of the Invention

The present invention relates to a computer-readable recording medium which records communication programs, a communication method and a communication apparatus. More particularly, the present invention relates to a computer-readable recording medium which records communication programs for performing collaboration between client terminals using a plurality of types of communication units having device type information and user identification information, a communication method, and a communication apparatus.

2. Description of the Related Art

Recently, it is recognized that collaboration by a plurality of persons using a computer system is effective for the improvement of intellectual productivity. When this collaboration is performed, data sharing using a network is facilitated. Therefore, collaboration in cooperation with network users can be smoothly performed. Consequently, there are developed groupware products such as an address book having a function of supporting communication among users or electronic conference aiding applications for carrying out editing and browsing of files while sharing an application.

On the other hand, one user recently has a plurality of terminal devices. Further, also a wide variety of tools capable of performing collaboration are found. Thus, the collaboration method becomes diverse. In parallel with this tendency, communication (multimodal) simultaneously using a plurality of terminal devices or applications is generally performed. For example, the following collaboration styles are established. An application of Personal Computer (PCs) is shared during a phone conversation, or textual information such as a Uniform Resource Locator (URL) or a phone number is communicated through an instant message (hereinafter, referred to as an "IM") or chat.

Accordingly, for example, when receiving a phone call from a partner, unless the condition of the partner is confirmed, a suitable collaboration cannot be performed. This is because an available collaboration method varies depending on the situation where the partner makes a call using a fixed Internet Protocol (IP) phone or using a softphone which operates on the PC. Thus, a procedure in performing collaboration becomes extremely complicated.

Further, in a case where a user having a plurality of terminal devices or a plurality of Identifications (IDs) properly uses the terminal devices or the IDs at the right place and the right time, the user must individually examine for himself a PC IP address or an IM or chat ID used or must confirm it with the partner. Further, in a case of sharing an application to perform collaboration, both the users must confirm whether an application with an application sharing function is installed or whether these applications have interconnectibility. Moreover, even after the collaboration method is determined, the user must input access destination information into the PC to start the collaboration.

Some softphones which operate on the PC have a mere call function or message function as well as a collaboration function such as a file transfer function, an application sharing function and a shared whiteboard function. Further, some softphones have a user state monitoring function called a buddy list. When previously registering on the buddy list a SIP URI (ID for an application which communicates using a Session Initiation Protocol (SIP) such as an IP phone or an IM) of a specific user, a user can always confirm a softphone state (such as on-line or off-line) of the specific user. Further, when selecting the softphone, a user can easily make a call, transmit a message by an IM, or perform application sharing. However, use of a buddy list is limited to that within one terminal device and therefore, the buddy list is available only in a phone or IM using a softphone. Moreover, the application sharing function is available only in a PC having installed therein the softphone. Further, by orally confirming an application available to a partner or by manually performing a format conversion if unable to perform the application sharing, a user must transmit a file in some way. Therefore, it is difficult for a user to select a suitable collaboration method. Accordingly, when one user uses a plurality of varied terminal devices at the same time, a complicated procedure is required.

Therefore, there is known a method for holding phone call session information and specifying, when an access request by another communication method is made, a partner from the session information to thereby establish a connection (see, e.g., Japanese Unexamined Patent Publication No. 2001-94671). According to Japanese Unexamined Patent Publication No. 2001-94671, in the act of making a line response in a call center, a customer and an operator can share a World Wide Web (Web) screen and the customer can make a reservation for a phone from the Web screen. Therefore, without specifying a partner ID, the customer can make a call and share a Web page.

However, in Japanese Patent Application Publication Unexamined No. 2001-94671, the following problems occur. That is, the use environment of the collaboration tools is limited to a call center. Further, the collaboration method is limited to a collaboration using a phone and a Web and therefore, is rarely applied to general collaboration using various communication tools or applications.

Accordingly, when each of a plurality of users performs collaboration using a plurality of terminal devices, the users cannot easily find that which application is available to themselves and which terminal device and ID are available to make an access. Further, the users cannot easily control their communication media and applications. Therefore, the users cannot fluently perform collaboration.

SUMMARY OF THE INVENTION

In view of the foregoing, it is an object of the present invention to provide a computer-readable recording medium which records communication programs, communication method and communication apparatus capable of easily performing selection and execution of communication units according to communication units available to communication partners.

To accomplish the above objects, according to one aspect of the present invention, there is provided a computer-readable recording medium which records a communication program for performing collaboration between client terminals using a plurality of types of communication units having device type information and user identification information. The program recorded on the computer-readable recording medium allows a computer to serve as: a profile management unit which manages, for each user, specific information including a combination of the device type information and the user identification information in each of the communication units, and a user ID associated with the combined information; an application controller which, when a session using any one of the communication units is established between users, refers to the specific information managed by the profile management unit and associates the user ID with the combination of the device type information and the user identification information in each of the communication units where the session is established; a collection unit which collects presence information where state information indicating whether the communication unit is available is associated with the combination of the device type information and the user identification information in each of the communication units; and a presence management unit which, when the user ID is specified by the application controller, refers to the presence information and reports the presence information to the client terminals of the users where the session is established.

According to another aspect of the present invention, there is provided a communication method for performing collaboration between client terminals using a plurality of types of communication units having device type information and user identification information. This communication method comprises the steps of: managing, for each user, specific information including a combination of the device type information and the user identification information in each of the communication units, and a user ID associated with the combined information; referring to, when a session using any one of the communication units is established between users, the specific information and associating the user ID with the combination of the device type information and the user identification information in each of the communication units where the session is established; collecting presence information where state information indicating whether the communication unit is available is associated with the combination of the device type information and the user identification information in each of the communication units; and referring to, when the user ID is specified, the presence information and reports the presence information to the client terminals of the users where the session is established.

According to yet another aspect of the present invention, there is provided a communication apparatus for performing collaboration between client terminals using a plurality of types of communication units having device type information and user identification information. This apparatus comprises: a profile management unit which manages, for each user, specific information including a combination of the device type information and the user identification information in each of the communication units, and a user ID associated with the combined information; an application controller which, when a session using any one of the communication units is established between users, refers to the specific information managed by the profile management unit and associates the user ID with the combination of the device type information and the user identification information in each of the communication units where the session is established; a collection unit which collects presence information where state information indicating whether the communication unit is available is associated with the combination of the device type information and the user identification information in each of the communication units; and a presence management unit which, when the user ID is specified by the application controller, refers to the presence information and reports the presence information to the client terminals of the users where the session is established.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows a user profile table.

FIG. 14 is a block diagram showing a system according to a second embodiment.

FIG. 15 shows a user profile table according to a second embodiment.

FIG. 16 shows a preference table.

DESCRIPTION OF THE PREFERRED EMBODIMENTS

Figure 1:
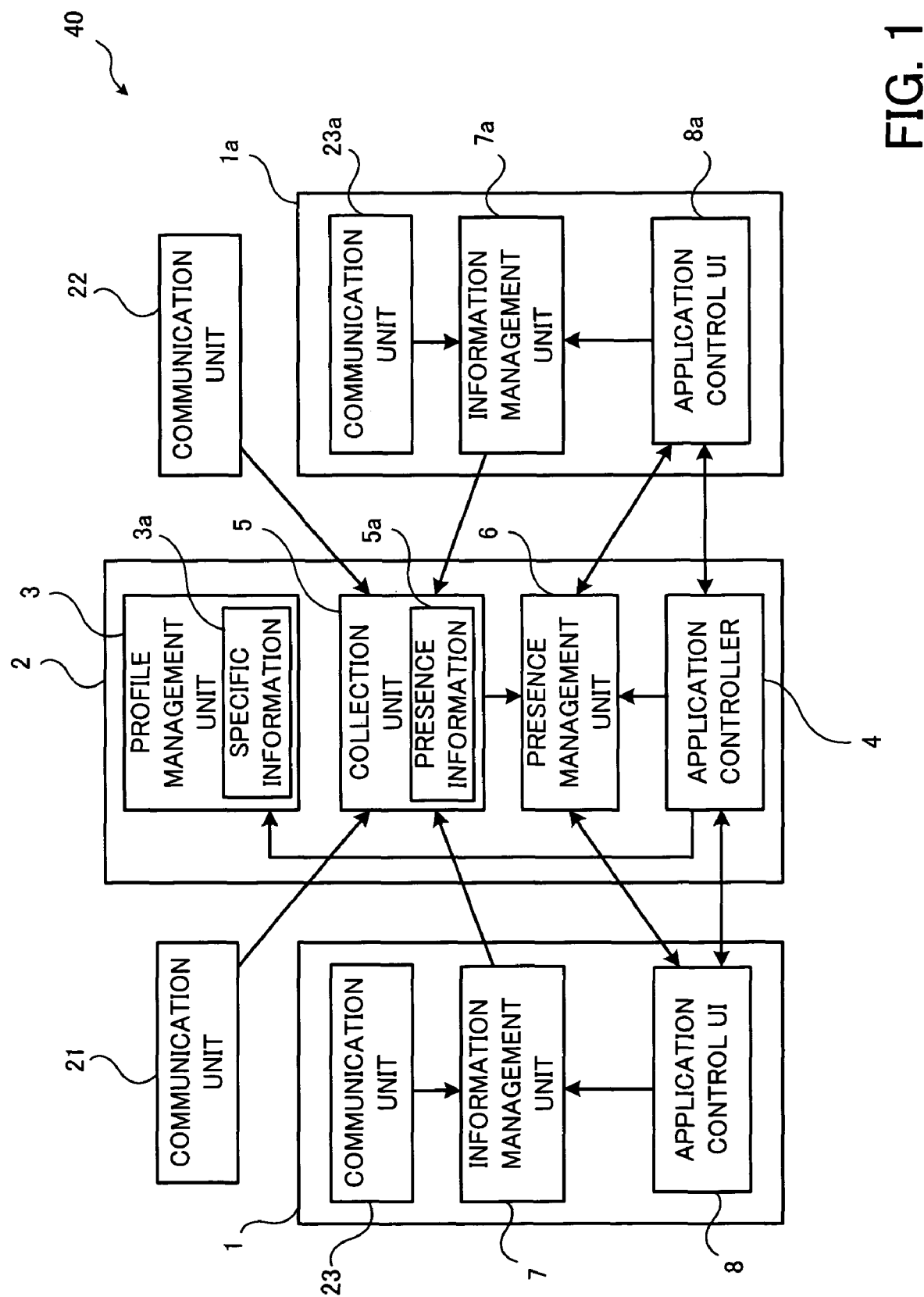
FIG. 1 illustrates a principle of the present invention.

Preferred embodiments of the present invention will be described in detail below with reference to the accompanying drawings, wherein like reference numerals refer to like elements throughout.

First, an outline of the invention applied to the embodiment will be described and then, a specific content of the embodiment will be described.

FIG. 1 illustrates a principle of the present invention.

A communication system 40 shown in FIG. 1 comprises client terminals 1 and 1a each having the same functions, and a server 2.

The client terminal 1 (1a) has an information management unit 7 (7a) and an application control UI 8 (8a).

The information management unit 7 (7a) collects, from a communication unit 23 (23a) within the terminal device, information on application states or on peripheral devices and services, and registers the information on the server 2.

The application control UI 8 (8a) is a user interface which obtains, from the server 2, computer environment information of a user himself and collaboration partner and displays the information to perform an operation for collaboration with the client terminal 1a (1) of a communication partner.

The server 2 has a profile management unit 3, an application controller 4, a collection unit 5 and a presence management unit 6.

The profile management unit 3 manages specific information 3a including a combination of device type information and user identification information in each communication unit, and a user ID associated with the combined information.

The application controller 4, when a session using any one of the communication units is established between users, refers to the specific information 3a managed by the profile management unit 3 and associates the user ID with the combination of the device type information and user identification information in the communication units where the session is established.

Further, the application controller 4 performs control of various types of the communication units. For example, the controller 4 creates a new session, obtains session information from a dedicated server such as an SIP server or an IM server, for example, when the communication unit is a unit using a Voice over Internet Protocol (VoIP) or an IM, and performs a file transmission.

The collection unit 5 collects presence information 5a where state information indicating whether the communication unit is available is associated with the device type information and user identification information in each communication unit.

This presence information 5a stores data collected from the information management unit 7 (7a) or data collected from the communication units 21 and 22 through a dedicated server (not shown).

The presence management unit 6, when the user ID is specified by the application controller 4, refers to the presence information 5a and reports the presence information in the communication unit available to a communication partner to each of the client terminals 1 and 1a of users where the session is established.

According to such a communication system 40, information on the communication units 21, 22, 23 and 23a is collected into the presence management unit 6 of the server 2 through the information management units 7 and 7a. Further, when a session, for example, between the communication units 21 and 22 is established, presence information of a communication partner is reported to each of the application control UIs 8 and 8a. This information contains information necessary for performing collaboration with a communication partner, for example, an IP address or a user ID. Therefore, by operating the application control UI 8 (8a), a user can easily realize the collaboration without confirming the IP address or the user ID with a partner or without directly inputting it manually.

Embodiments of the present invention will be described in detail below.

Figure 2:
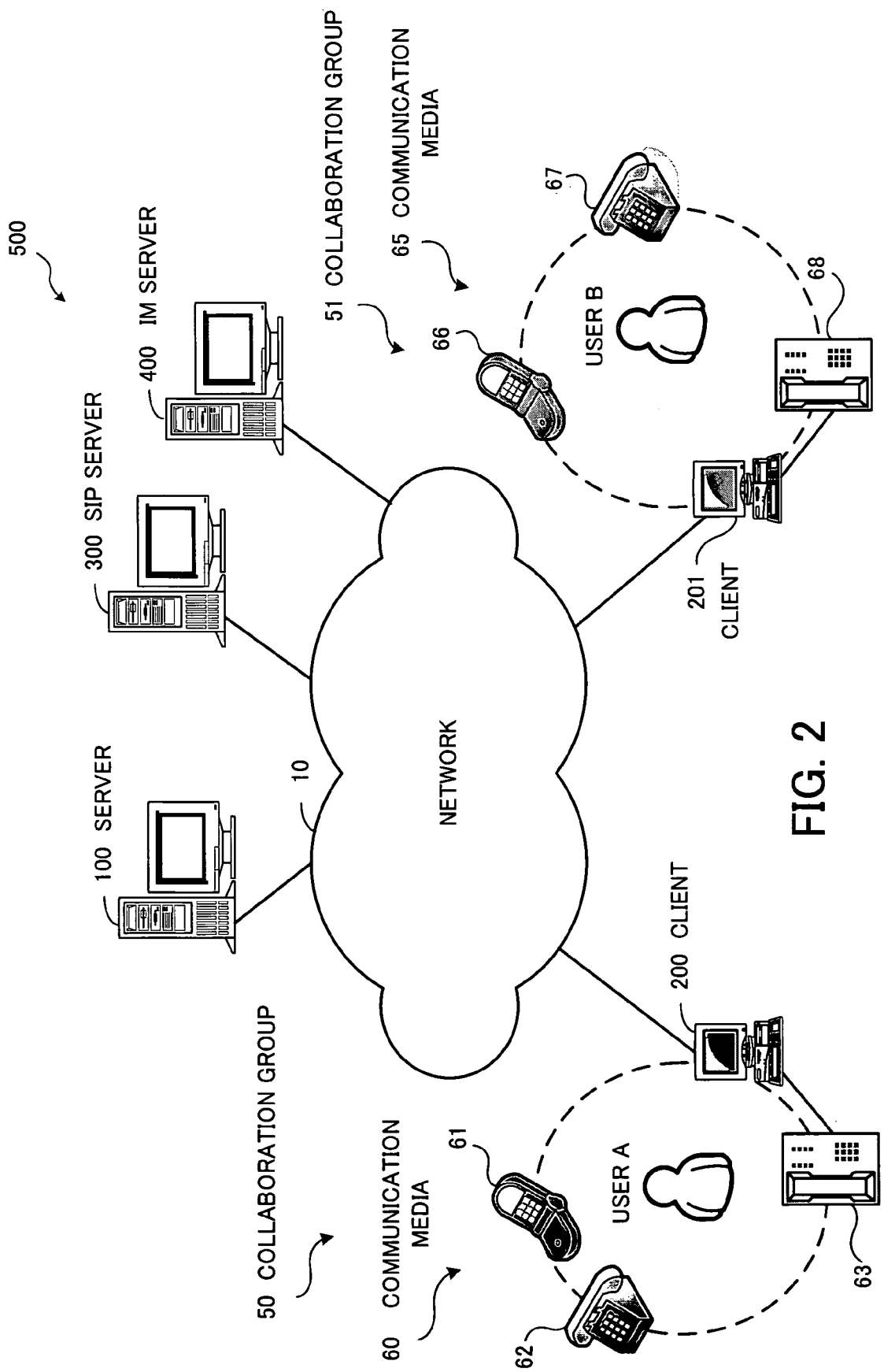
FIG. 2 shows a system configuration example according to a first embodiment.

FIG. 2 shows a system configuration example according to a first embodiment.

A communication system 500 shown in FIG. 2 is a system having a function of automatically adding the collaboration based on existing session information. In the system 500, a server 100, clients 200 and 201, a SIP server 300 and an IM server 400 are connected to each other through a network 10.

Further, a collaboration group 50 composed of the client 200 and communication media 60, and a collaboration group 51 composed of the client 201 and communication media 65 are formed in the communication system 500.

In each of the clients 200 and 201, applications for an IM, an e-mail and a file transfer unit are installed.

The communication media 60 has a mobile-phone 61, an IP phone 62 with an IP address for performing a real-time voice call using an Internet and a softphone (software phone) 63 for operating on the application of the client 200.

Each of the mobile-phone 61, the IP phone 62, the softphone 63 and the respective applications of the client 200 forms a communication tool for performing the collaboration with the collaboration group 51.

The communication media 65 has a mobile-phone 66, IP phone 67 and softphone 68 each having the same function as that of each tool of the communication media 60.

Each of the mobile-phone 66, the IP phone 67, the softphone 68 and the respective applications of the client 201 forms a communication tool for performing the collaboration with the collaboration group 50.

A user A and a user B perform the collaboration with each other using the communication tools of the collaboration group 50 and the collaboration group 51, respectively.

The server 100 is a computer which collects information from the clients 200 and 201 and manages the information.

The SIP server 300 helps as an intermediary processing such as VoIP session establishment, editing or completion which is performed between communication tools. Further, the IM server 400 has a function of managing and referring to user presence information on IM and performing transmission and reception of the IM. That is, the SIP server 300 and the IM server 400 have a function of reporting event or presence information on the VoIP or the IM to the outside. These servers are preferably a server such as Parlay (trademark) having an open interface or a SIP application server for obtaining a SIP signaling program.

Next, a hardware configuration of a server used in the present embodiment will be described.

Figure 3:
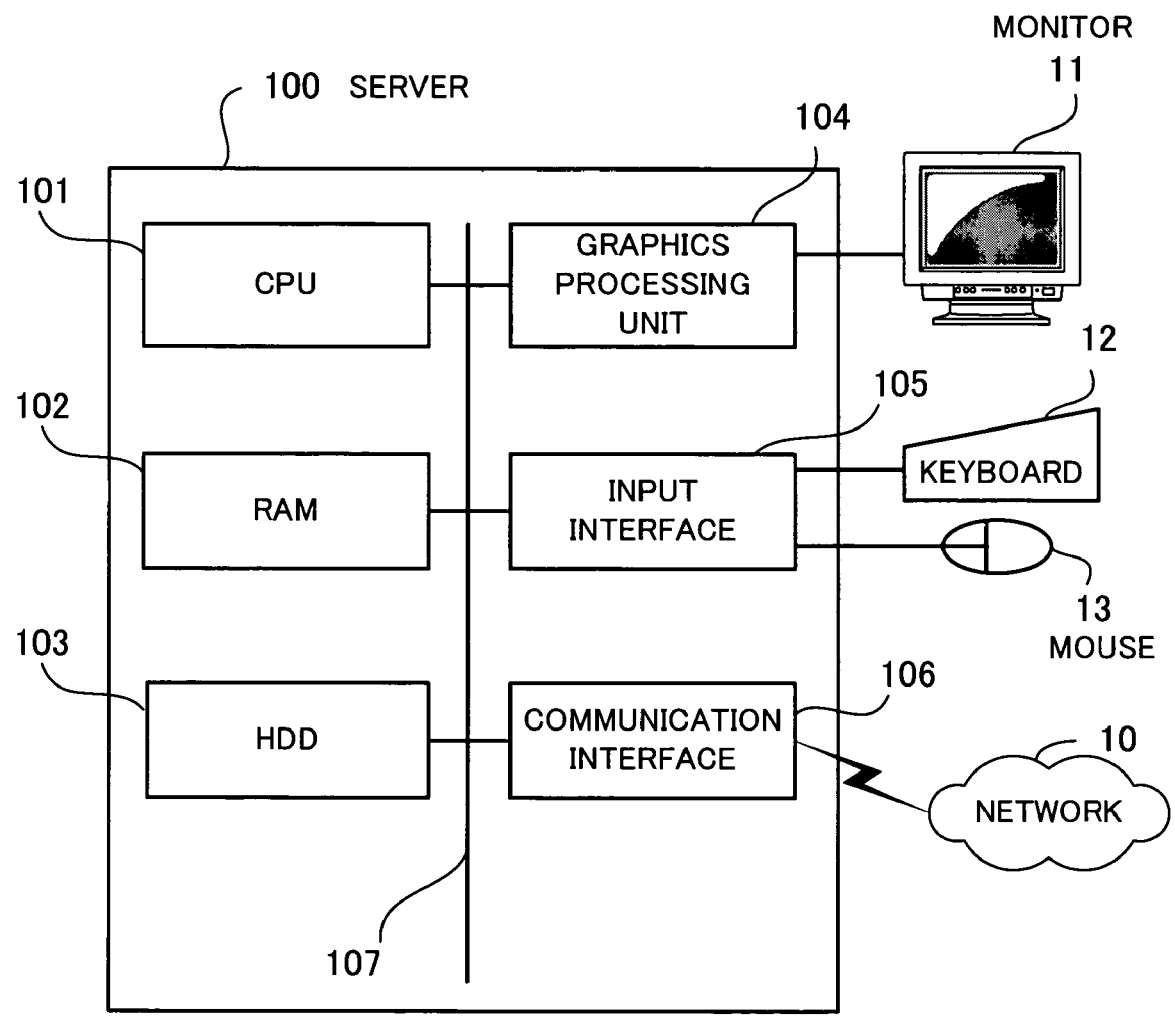
FIG. 3 shows a hardware configuration of a server used in the present embodiment.

FIG. 3 shows a hardware configuration of a server used in the present embodiment.

The server 100 as a whole is controlled by a Central Processing Unit (CPU) 101. To the CPU 101, a Random Access Memory (RAM) 102, a Hard Disk Drive (HDD) 103, a graphics processing unit 104, an input interface 105 and a communication interface 106 are connected through a bus 107.

The RAM 102 temporarily stores at least a part of an Operating System (OS) program or application program executed by the CPU 101. The RAM 102 stores various data necessary for processing through the CPU 101. The HDD 103 stores the OS and application programs. Further, the HDD 103 stores a program file.

To the graphics processing unit 104, a monitor 11 is connected. The graphics processing unit 104 displays an image on a screen of the monitor 11 in accordance with commands from the CPU 101. To the input interface 105, a keyboard 12 and a mouse 13 are connected. The input interface 105 transmits to the CPU 101 through the bus 107 a signal transmitted from the keyboard 12 or the mouse 13.

The communication interface 106 is connected to the network 10. The communication interface 106 transmits and receives data to and from other computers through the network 10.

By the above-described hardware configuration, the processing function of the present embodiment can be realized. FIG. 3 shows the configuration of the server 100. Further, also the clients 200 and 201 can be realized by using the same hardware.

In order to perform the collaboration in the system with the above-described hardware configuration, the following functions are provided within the server 100 and the clients 200 and 201.

Figure 4:
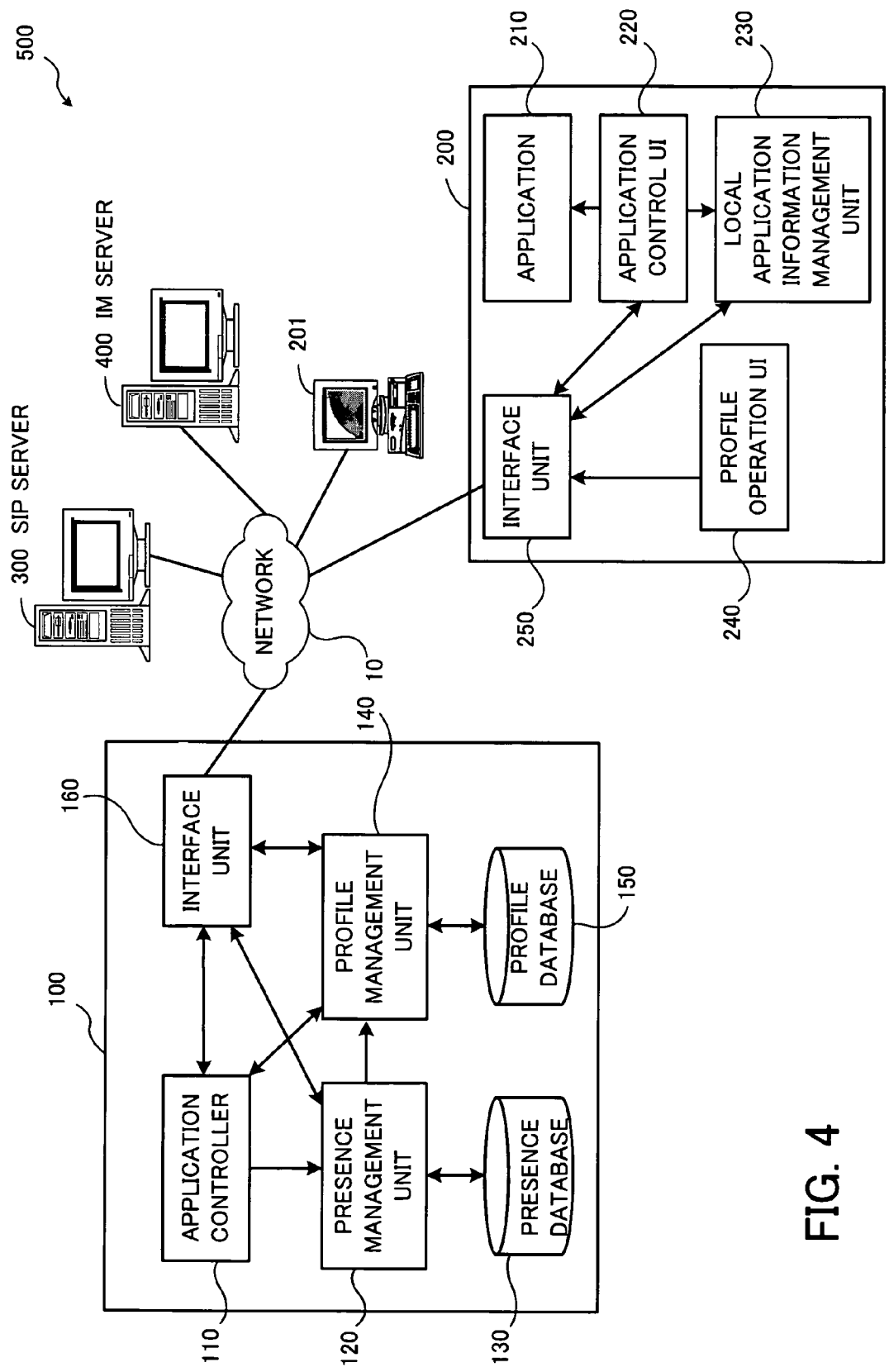
FIG. 4 is a block diagram showing functions of a server and a client.

FIG. 4 is a block diagram showing functions of a server and a client.

The server 100 has an application controller 110, a presence management unit 120, a presence database 130, a profile management unit 140, a profile database 150 and an interface unit 160.

The application controller 110 performs control of various types of the applications or the communication media 60 and 65 as follows. That is, the controller 110 creates a new session, obtains session information from the SIP server 300 or the IM server 400, and performs a file transmission.

Further, the application controller 110, when obtaining presence information from the SIP server 300 or the IM server 400, converts the information into a format readable by the presence management unit 120, if necessary, and then transmits the information to the presence management unit 120. Examples of the presence information transmitted to the unit 120 include: the SIP URI and IP address of a communication tool of the user A; information indicating whether the communication tool is on-line, off-line or busy when the tool is the mobile-phone 61, the IP phone 62 or the softphone 63; and the SIP URI of the mobile-phone 66, IP phone 67 or softphone 68 of the user B as a communication partner when the tool is busy.

The presence management unit 120, when obtaining presence information from the application controller 110 or the after-mentioned local application information management unit 230, stores and manages the information in the presence database 130 for each user and reports the information to the clients 200 and 201 depending on circumstances.

The profile management unit 140, when obtaining a user profile in which the respective specific information units including a combination of media type (device type information) and media ID (user identification information) in the communication media 60 or the client 200, and a user ID of the user A associated with the combined information are associated with each other, stores and manages the user profile in the profile database 150. The user profile will be described in detail later.

The interface unit 160 performs data communication through the network 10 in accordance with Transmission Control Protocol (TCP)/IP.

Next, the clients 200 and 201 will be described.

The principal units of functions in the clients 200 and 201 are equivalent to each other and therefore, a function of the client 200 will be typically described.

The client 200 has an application 210, an application control UI 220, a local application information management unit 230, a profile operation UI 240 and an interface unit 250.

The application 210 is an application installed on the client 200.

The application control UI 220 is a user interface which obtains communication tool environment information of the user A and the user B from the server 100 and displays the information, for example, on the monitor 11 to perform the operation for the collaboration.

The local application information management unit 230 refers to, for example, a registry or searches a specific folder to thereby collect a state of the application 210, such as what the type of the installed application 210 is, or whether the application 210 has an application sharing function, and to register the state on the server 100.

The profile operation UI 240 is a user interface which, when a user performs a profile registration operation by the input using the keyboard 12 or mouse 13, transmits the registration information to the profile management unit 140.

The interface unit 250 has the same function as that of the interface unit 160.

The functions of the client 201 are hereinafter represented by putting "a" on a foot of each unit of the functions in the client 200. For example, the application control UI of the client 201 is represented as an application control UI 220a.

Figure 5:
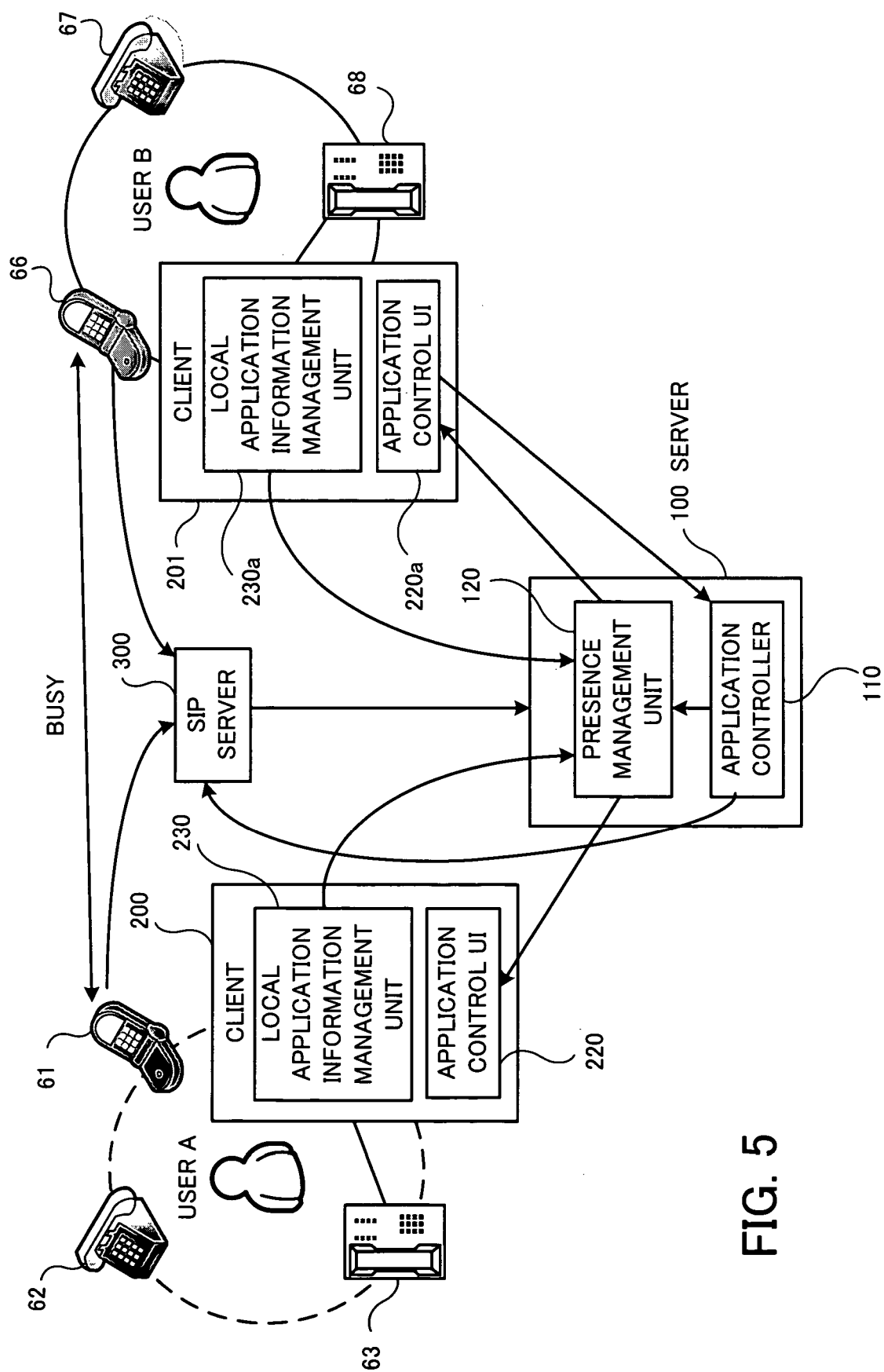
FIG. 5 illustrates an outline of an operation in a communication system.

FIG. 5 illustrates an outline of an operation in a communication system.

In FIG. 5, description of the IM server 400 and a part of functions of the server 100 as well as that of a part of functions of the clients 200 and 201 are omitted.

When the client 200 starts up, the local application information management unit 230 checks the application 210 installed within the client 200 and reports as presence information of the user A the obtained information to the presence management unit 120.

On the other hand, the presence information of the mobile-phone 61, the IP phone 62 and the softphone 63 is reported from the SIP server 300 or the IM server 400 to the presence management unit 120 through the application controller 110. This operation is performed for a communication tool in each user.

Herein, as to which presence information is reported from the SIP server 300 and the IM server 400, when the user A and the user B register their own SIP URI on the profile management unit 140 (in the after-mentioned registration phase of the user profile), the application controller 110 gives instructions to the SIP server 300 and the IM server 400.

The presence management unit 120 classifies and manages for each user the presence information reported from the application controller 110 or the local application information management unit 230. When the session between a communication tool of the user A and a communication tool of the user B is established (including a case where the session is already established at the time when a client is activated), the presence management unit 120 transmits the presence information of the users A and B to each of the application control UI 220 of the client 200 and the application control UI 220a of the client 201.

Herein, for example, when receiving the presence information of the user B, the application control UI 220 makes that effect pop-up on the monitor 11 to display the presence information of the user B, that is, a communication tool available to the user B. The display method is not particularly limited. Examples of the display method include a method for displaying at sight the whole presence information of the client 200 and the client 201 (transmission source and destination) and a method for highlighting only the communication tools mutually available to each other. Consequently, the user A can find the application 210a or communication media 65 available to the user B.

Figure 6:
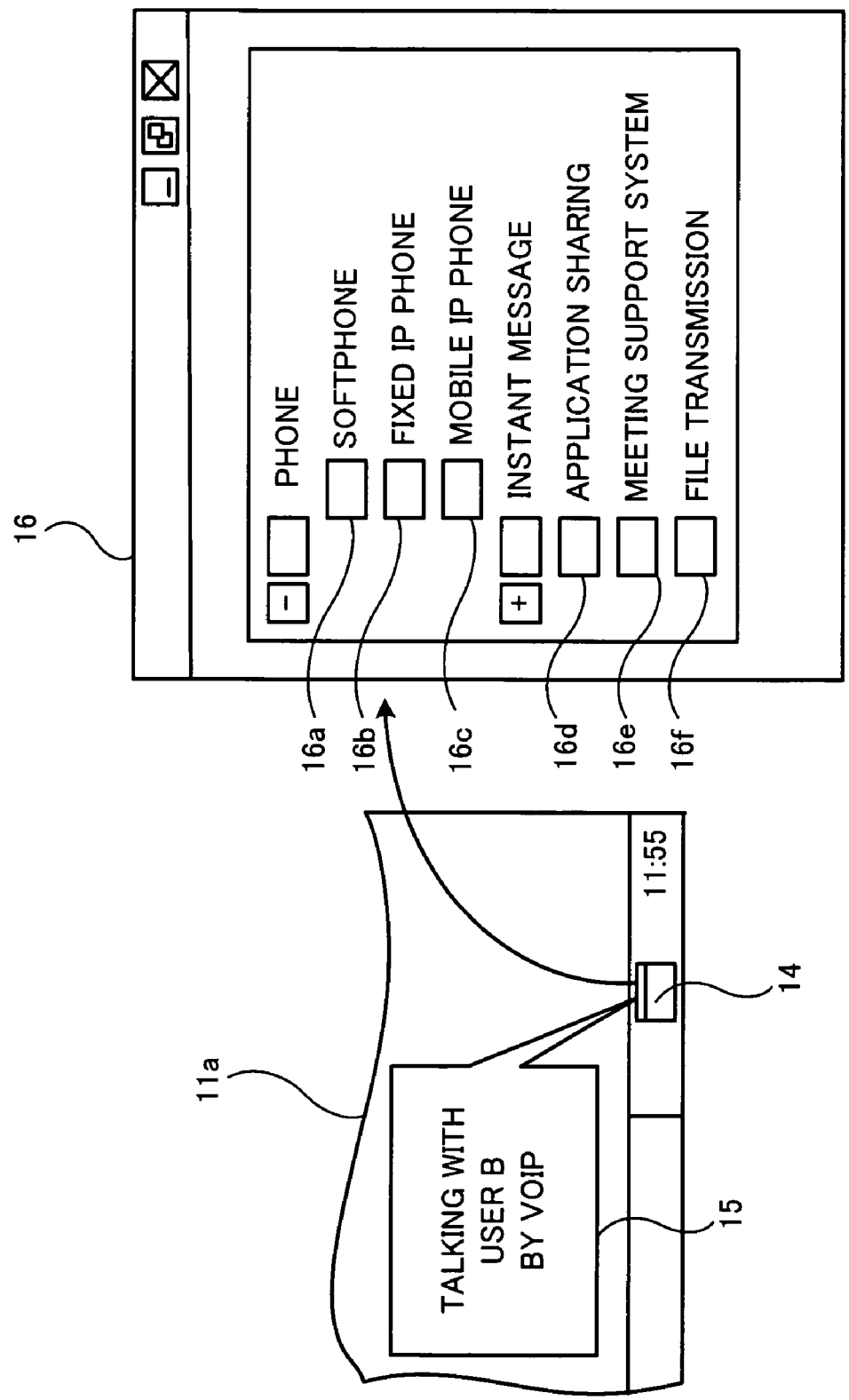
FIG. 6 shows an operation screen of an application control UI according to a first embodiment.

FIG. 6 shows an operation screen of the application control UI according to the first embodiment.

The application control UI 220 displays on an operation screen 11a a collaboration confirmation unit 14 such as an icon for confirming a state of the collaboration. Further, the application control UI 220, when the collaboration with a communication tool used by the user B is established, displays a dialogue balloon 15 to report the presence information to the user A. Further, when the user A clicks the collaboration confirmation unit 14, the UI 220 displays on the operation screen 11a a communication tool environment screen 16 indicating a communication tool currently available to the user B.

Further, on the communication tool environment screen 16, items and icons 16a to 16f associated with the items are displayed for each communication tool. For example, when a softphone, a fixed IP phone and a mobile IP phone are available as a voice communication tool, these are displayed as each item of the telephone as shown in FIG. 6.

Thereafter, when the user A double-clicks, for example, the icon 16a to select a communication tool displayed on the communication tool environment screen 16, the application control UI 220 allows the application control UI 220a to execute corresponding processing through the server 100. For example, the application control UI 220 performs file transmission and the application control UI 220a makes a reaction corresponding to the file.

When selecting the respective items of the communication tool environment screen 16, the user A can start the collaboration with the user B by using the selected communication tool.

In order to perform this collaboration, the communication system 500 executes three phases of the user profile registration phase, the presence collection and reporting phase and the collaboration addition phase. The respective phases will be described below step by step.

<Registration Phase of User Profile>

The registration phase of user profile is a phase executed when the user A registers on the server 100 a user profile as information on the user ID given to various communication media.

The user A operates the profile operation UI 240 to access the profile management unit 140 of the server 100 and to store a user profile in the profile database 150.

On this occasion, when information on the media is updated, an event report request is made to thereby surely report the event information (for example, in the case of an IP phone, information updated when the phone line is made busy or when the phone is logged in) to the SIP server 300. The event report request will be described in detail below.

Next, a user profile stored in the profile database 150 will be described.

In the present embodiment, the user profile is tabulated and stored.

The user profile may be expressed, for example, by extensible Markup Language (XML).

FIG. 7 shows a user profile table.

A user profile table 151 has columns (attributes) of the user ID, media type, media ID and explanation. Laterally arranged items in the respective columns are associated with each other to form one user profile.

In the column of the user ID, there are set the user ID "foo" as an identifier of the user A and user ID "goo" as an identifier of the user B in the communication system 500.

In the column of the media type, device type information of the communication media 60 and application 210 available to the user A is set in association with the user ID "foo". Further, device type information of the communication media 65 and application 210a available to the user B is set in association with the user ID "goo".

Herein, for example, "voip" of the user ID "foo" means a media type of the mobile-phone 61, the IP phone 62 and the softphone 63, "im" means a media type of an instant message, "mail" means a media type of a mail address of the mobile-phone 61, and "collabo" means a media type allocated to a client program of the client 200. That is, the "collabo" is a concept containing the application control UI 220, the local application information management unit 230 and the profile operation UI 240.

In the column of the media ID, IDs for specifying communication media or applications (communication media- or application-specific ID) are set.

In the column of the explanation, there is set (described) a concrete explanation that the media ID is given to which media. The explanation which is set in this explanation column is described in each item of the communication tool environment screen 16.

Thus, a communication tool of which the presence information is reported from the local application information management unit 230 and the local application information management unit 230a to the presence management unit 120 and a communication tool of which the presence information is reported from the SIP server 300 and the IM server 400 to the presence management unit 120 are set individually.

Next, a processing sequence (processing operation) in the registration phase of the user profile will be described by taking as an example the registration phase of the IP phone.

Figure 8:
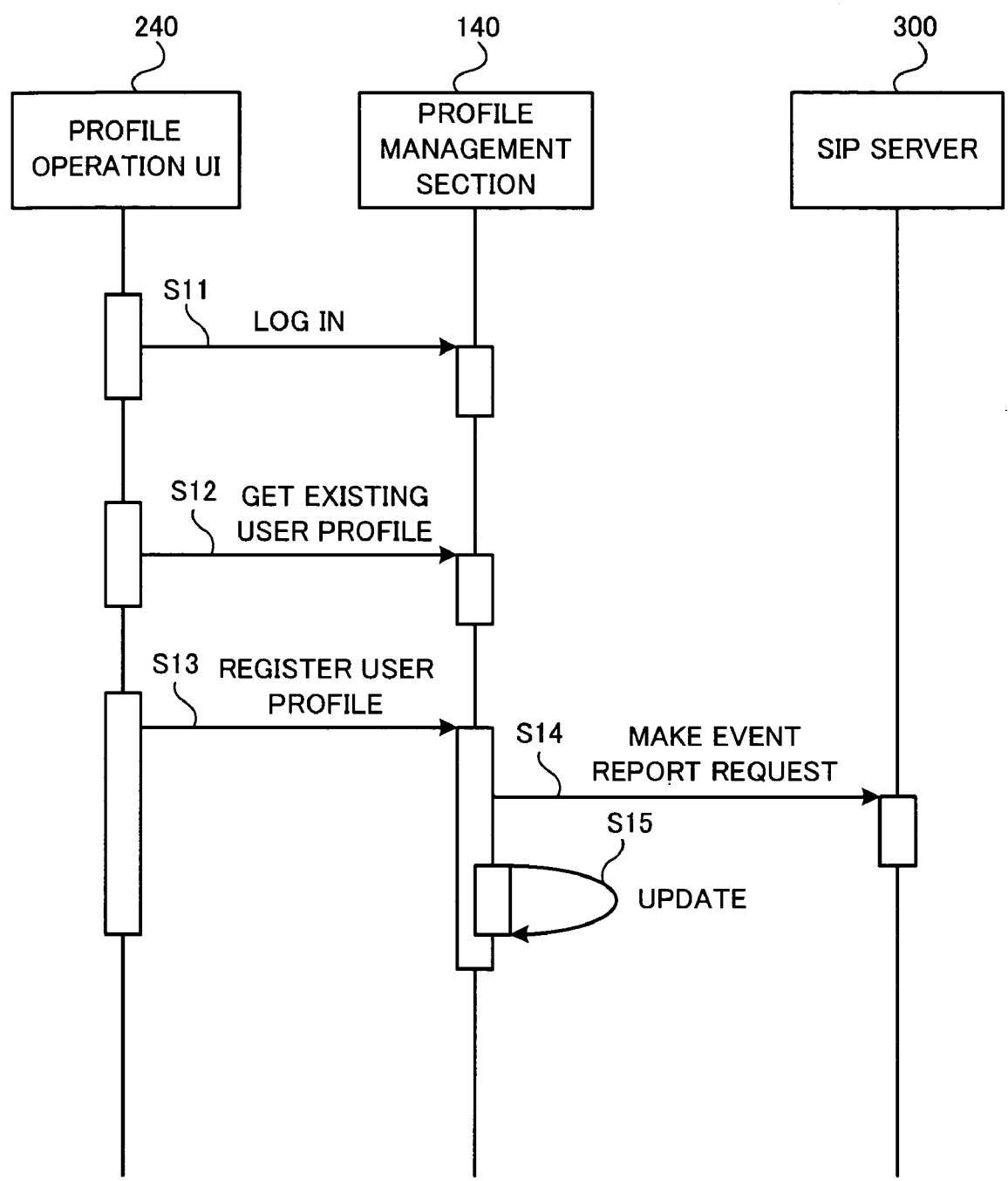
FIG. 8 shows a processing sequence in a registration phase of a user profile.

FIG. 8 shows a processing sequence in the registration phase of the user profile.

First, the profile operation UI 240, when confirming a log-in request made by the input of the user ID and password by the user A, transmits the log-in information (authentication information) to the profile management unit 140 (step S11).

Next, the authentication of the user is performed. When the user is authenticated, the profile operation UI 240 gets the existing user profile from the profile management unit 140 (step S12).

Thereafter, when the user A operates the profile operation UI 240 to update (register or delete) the user profile, the profile operation UI 240 transmits to the profile management unit 140 the updated user profile containing information of a media type, a media ID and an explanation (step S13).

Further, the profile management unit 140 makes an event report request to the SIP server 300 (step S14). When this event report request is the registration of the SIP URI, the unit 140 makes an information transmission request (subscribe) to the SIP server 300 or the IM server 400 to instruct the server to transmit the event. Further, when the event is the change of the SIP URI, the unit 140 performs deletion (unsubscribe) of an old SIP URI and then makes a transmission request of a new SIP URI. Further, when the event is the deletion of the SIP URI, the unit 140 performs deletion of the corresponding SIP URI.

Thereafter, the profile management unit 140 updates the user profile table 151 (step S15).

With that, the processing sequence in the registration phase of the user profile is completed.

<Presence Collection and Reporting Phase>

The presence collection and reporting phase is a phase executed when the server 100 obtains as presence information the present state (online, offline, busy or installed) of the communication media 60 and application 210 used by the user A and the present state of the communication media 65 and application 210a used by the user B and thereafter, the server 100 reports the obtained presence information of a communication partner to each of the communicating clients 200 and 201. This collecting method of the presence information varies depending on the communication tool.

For example, the presence information of the communication media 60 and 65 is collected as follows. That is, by causing a call event (event), the SIP server 300 and the IM server 400 report the event to the application controller 110. The application controller 110, when receiving the call event, checks a format of the event. If the format must be converted, the controller 110 converts the format into another for writing the event in the presence database 130. For example, when a file in the XML format is stored in the presence database 130, the controller 110 executes schema conversion. Further, the application controller 110 refers to the user profile table 151 through the profile management unit 140 and searches for a user ID in the SIP URI of the VoIP or the IM to associate the user ID with the client 200 so as to obtain the presence information for each user. Thereafter, the application controller 110 transmits the presence information to the presence management unit 120. The presence management unit 120 stores the received presence information in the presence database 130.

On the other hand, the presence information of the application 210 is collected as follows. That is, the local application information management unit 230 refers to a registry of the client 200 or searches a specific folder. Alternatively, users register an application used in the collaboration. Thus, the unit 230 obtains the presence information from the database having recorded therein system or application software configuration data. The unit 230 obtains also the presence information of the application 210a in the same manner as in the application 210.

In the presence database 130, the presence information is, for example, tabulated and stored.

Figure 9:
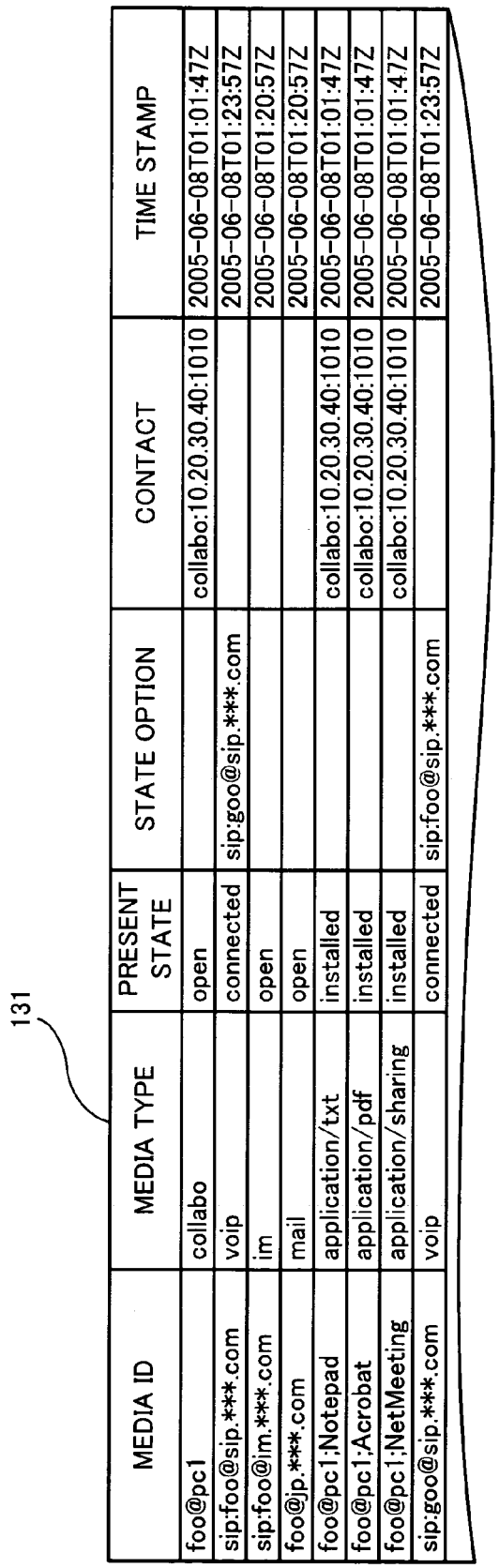
FIG. 9 shows a presence table.

FIG. 9 shows a presence table.

A presence table 131 has columns of the media ID, media type, present state, state option, contact and time stamp. The laterally arranged items in the respective columns are associated with each other to form one presence information unit. For example, a media ID "foo@pc1", a media type "collabo", a present state "open", a state option "none", a contact "collabo:10.20.30.40:1010", and a time stamp "2005-06-08T01:01:47Z" form one presence information unit.

In the column of the media ID, IDs for identifying the communication media 60 or the application (Notepad, Acrobat (trademark)) installed in the client 200 are set. For the ID for the communication media 60 and that for the client 200, the same media ID as that set in the column of the media ID of the user profile table 151 is set. In the column of the media ID of the application, there is set the media ID in which the identification information (; Notepad; Acrobat (trademark); NetMeeting (trademark)) of the application follows the ID for the client 200, namely, "foo@pc1".

In the column of the media type, types of the communication media and applications are set. Herein, "collabo" means a media type of a client, namely, the client 200 and "application/*" (* shows an extension of an application data file) means an application.

In the column of the present state, present states of the communication media and applications are set. The present state of the communication media is set as follows. That is, when the application is available, "open" (online) is set. When the application is not available, "closed" (offline) is set. When the session is established between the application and another application, "connected" is set. For the present state of the application, "installed" is set.

In the column of the state option, when a present state of the communication media is "connected", a media ID for a partner during establishment of the session is set.

In the column of the contact, when the media type is "collabo" or "application", an IP address for the client 200 and a port number for the user interface as the window are set. The IP address and the port number are set when the client 200 logs into the server 100.

In the column of the time stamp, a date for the presence information to be updated is set.

According to the presence collection and reporting phase, when the registration of state information of the application is instructed from the application control UI 220 to the local application information management unit 230 at the start-up of the client 200 or by the request from users, the local application information management unit 230 collects a present state of the application 210 within the client 200 and transmits the present state to the presence management unit 120. The unit 120 receives the present state of the application and then stores it in the presence database 130. Thus, the contents of the presence database 130 are updated.

Further, in updating the presence information, it is previously known that the present state is "connected". Therefore, after updating the presence database 130, the unit 120 searches for the present states of the clients 200 and 201 (both the communicating clients) from the SIP URI set in the column of the state option. Then, the unit 120 transmits the presence information of both the communicating clients to the application control UI 220 of the client 200 as well as transmits the presence information of both the communicating clients to the application control UI 220a of the client 201. The application control UI 220 which receives the presence information displays the information on the monitor 11.

Next, a processing sequence in the presence collection and reporting phase of the communication media 60 will be described by taking as an example the presence collection and reporting phase of the IP phone.

Figure 10:
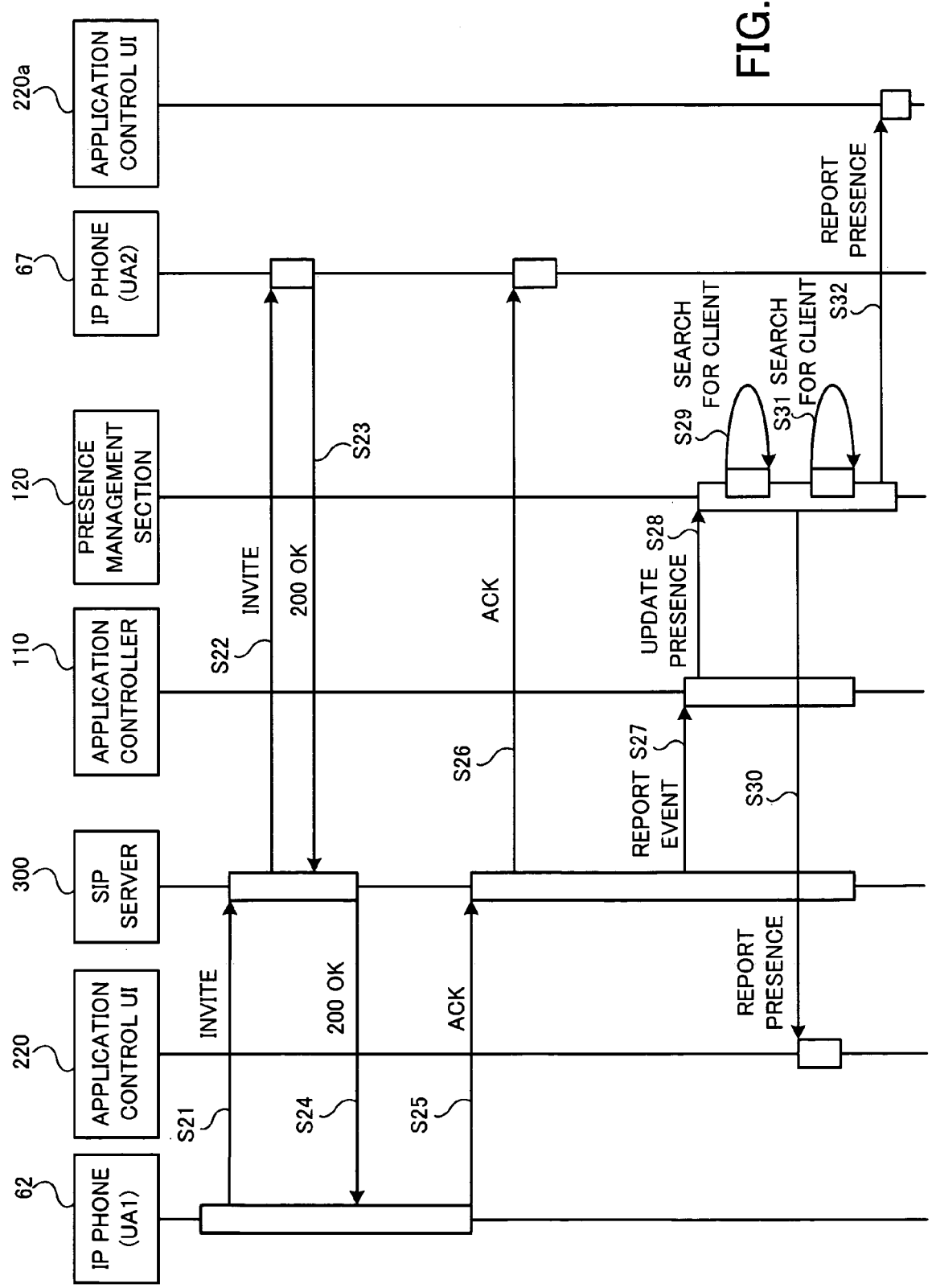
FIG. 10 shows a processing sequence in a presence collection and reporting phase of communication media (an example of VoIP).

FIG. 10 shows a processing sequence in the presence collection and reporting phase of the communication media.

First, the user A requests the IP phone 67 for voice communication using the IP phone 62 and thereby, call processing (SIP signaling in one-call) is executed for establishing the VoIP session to exchange voices between a user agent (hereinafter, referred to as a UA1) of the IP phone 62 and a user agent (hereinafter, referred to as a UA2) of the IP phone 67 (steps S21 to S26). Specifically, the UA1 transmits to the SIP server 300 a connection request (INVITE) to the UA2 (step S21).

Next, the SIP server 300 confirms the IP address of the IP phone 67 and transmits the INVITE to the IP phone 67 (step S22).

When confirming the connection of the IP phone 67, for example, by an offhook of a receiver, the UA2 returns to the SIP server 300 a success response (200 OK) to the INVITE (step S23).

Further, the SIP server 300 returns the success response (200 OK) to the UA1 (step S24).

Next, the UA1 transmits an ACK response (acknowledgment of the session establishment) to the SIP server 300 based on the success response from the SIP server 300 (UA2) (step S25).

Next, the SIP server 300 transmits the ACK response to the UA2 (step S26). Thus, a session is established between the IP phones 62 and 67. Over the established session, voice data is exchanged to make a communication state.

Next, the SIP server 300 reports a call event to the application controller 110 (step S27).

Further, when receiving the event, the application controller 110 performs schema conversion for writing the event in the presence table 131, if necessary, and causes the presence management unit 120 to update the presence information (step S28). Thus, the presence states of the IP phones 62 and 67 in the presence table 131 are set from "open" to "connected".

Next, the presence management unit 120 checks the present state in the case where in the presence table 131, the user ID is "foo" and the media type is "collabo" (step S29).

Further, the unit 120 reports the presence information of the user A and the user B to the client 200 (step S30).

Next, the unit 120 checks the present state in the case where in the presence table 131, the user ID is "goo" and the media type is "collabo" (step S31).

Further, the unit 120 reports the presence information of the user A and the user B to the client 201 (step S32).

Thus, a dialogue balloon 15 shown in FIG. 6 is displayed.

When a telephone call is completed, the SIP server 300 reports a call event to the application controller 110 again and thereby, the present state is updated from "connected" to "open".

Further, in the case of using an IM as the communication media, ordinary IM transmission processing, in place of the call processing in steps S21 to S26, is performed through the IM server 400. Next, a message transmission event is reported in place of the call event in step S27. Thus, the presence state is changed to "connected". Unlike the VoIP, the IM is incapable of expressly completing the conversation. Therefore, when a certain period of time passes after the transmission of the message, it is considered that the conversation is completed. Then, the presence state is updated from "connected" to "open".

Next, a processing sequence in the presence collection and reporting phase of the application 210 will be described.

Figure 11:
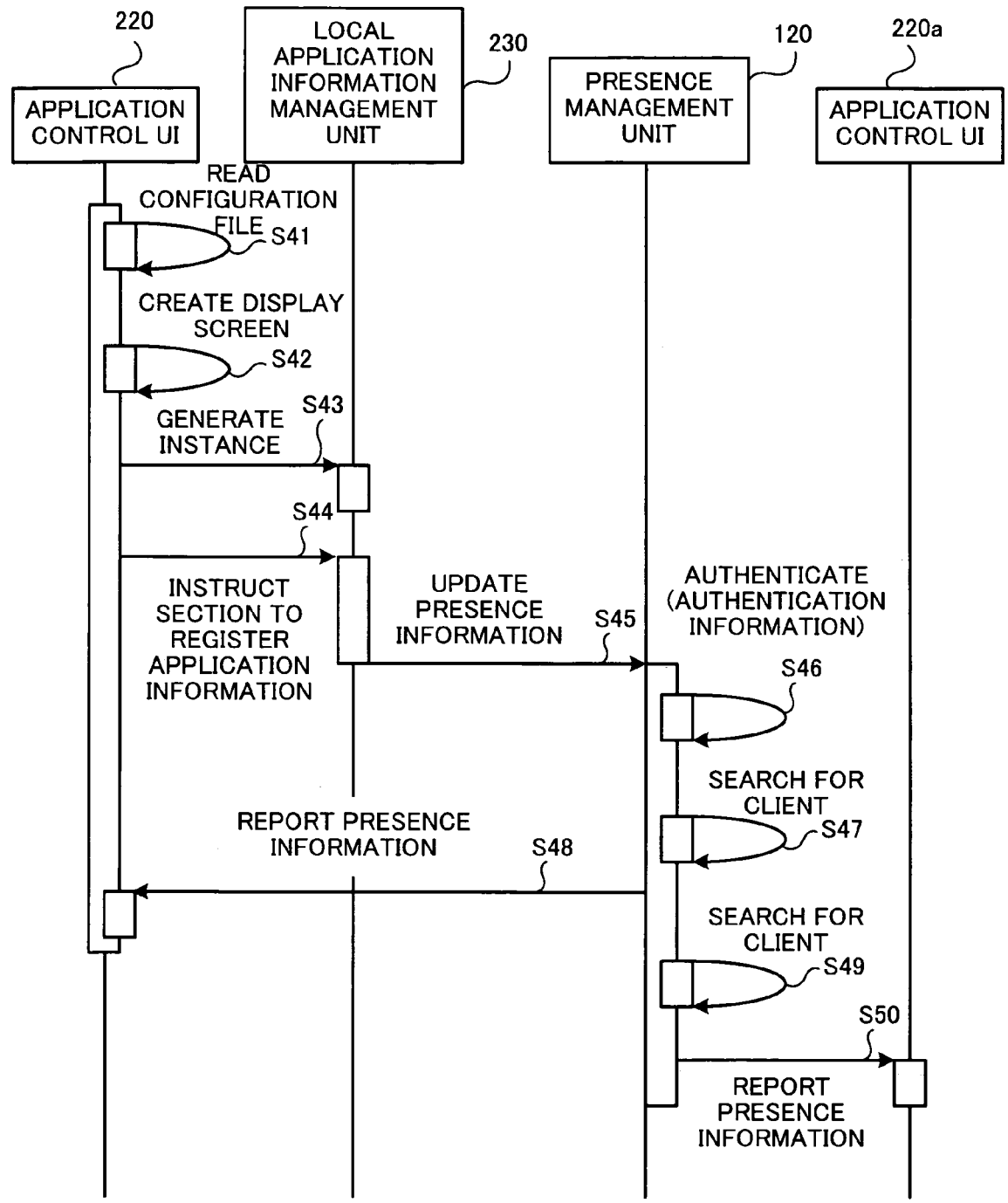
FIG. 11 shows a processing sequence in a presence collection and reporting phase of an application.

FIG. 11 shows a processing sequence in the presence collection and reporting phase of the application.

First, when the client 200 starts up, the application control UI 220 reads a configuration file such as an address, ID and password of the server 100 (step S41).

Next, the application control UI 220 creates an operation screen 11a for displaying the presence information on the monitor 11 (step S42). Generally, this screen is displayed, as an icon, in a task tray.

Next, the application control UI 220 generates an instance of the local application information management unit 230 (step S43).

Next, the application control UI 220 instructs the local application information management unit 230 to register application information (step S44).

Next, the local application information management unit 230 checks the application 210 installed within the client 200 and transmits to the presence management unit 120 the authentication information as well as the presence update request (step S45).

Next, the presence management unit 120 performs authentication based on the authentication information (step S46). When the user is authenticated, the unit 120 searches based on the user ID for a client having the present state of "open" (step S47).

Further, when finding a client having the present state of "open", the presence management unit 120 reports the presence information to the application control UI 220 (step S48). Thus, the states of the communication media and the application are displayed on the operation screen 11a.

Further, the presence management unit 120 checks a state of the session. When the session is established, the unit 120 specifies a communication partner and continuously searches for a client having the present state of "open" (step S49).

Further, the presence management unit 120 reports the presence information to the application control UI 220a (step S50).

With that, operations in the presence collection and reporting phase of the application are completed.

<Collaboration Tool Addition Phase>

The collaboration tool addition phase is a phase that is executed when the user A selects a desired tool from the communication tools displayed on the communication tool environment screen 16. The procedure varies depending on a type of the communication tool.

For example, when the communication tool is an IP phone, the procedure is as follows. First, the application control UI 220 executes call processing for giving the application controller 110 information which includes authentication information, a user ID "foo" of the user A (originating side) and a user ID "goo" of the user B (terminating side). Then, the control UI 220 calls an API (Application Program Interface) of the SIP server 300. As a result, the SIP session is established between the IP phones 62 and 67.

Further, for example, when the communication tool is an IM, the procedure is as follows. First, the application control UI 220 executes IM transmission processing for giving the application controller 110 information which includes authentication information, an originating side user ID and a terminating side user ID. Then, the controller 110 calls up an API of the IM server 400. As a result, a screen for transmitting a message to the user B is displayed on the monitor connected to the client 201.

Further, for example, when the communication tool is a file transmission, the procedure is as follows. First, the application control UI 220 performs a file transmission for giving the application controller 110 information which includes authentication information, a destination URI, a file name and content. Then, the application controller 110 transmits a specified file to the client 201 shown by the destination URI. Then, the application control UI 220a displays the received file on the monitor connected to the client 201.

Further, for example, when the communication tool is an application sharing tool such as a network conference tool, the application control UI 220 shares an application using an API of a shared application within the client 200. The API may vary by application and therefore, a driver plug-in may be made possible to allow extension and change.

Next, a processing sequence in the collaboration tool addition phase will be described by taking as an example a case of adding the IP phone 62.

Figure 12:
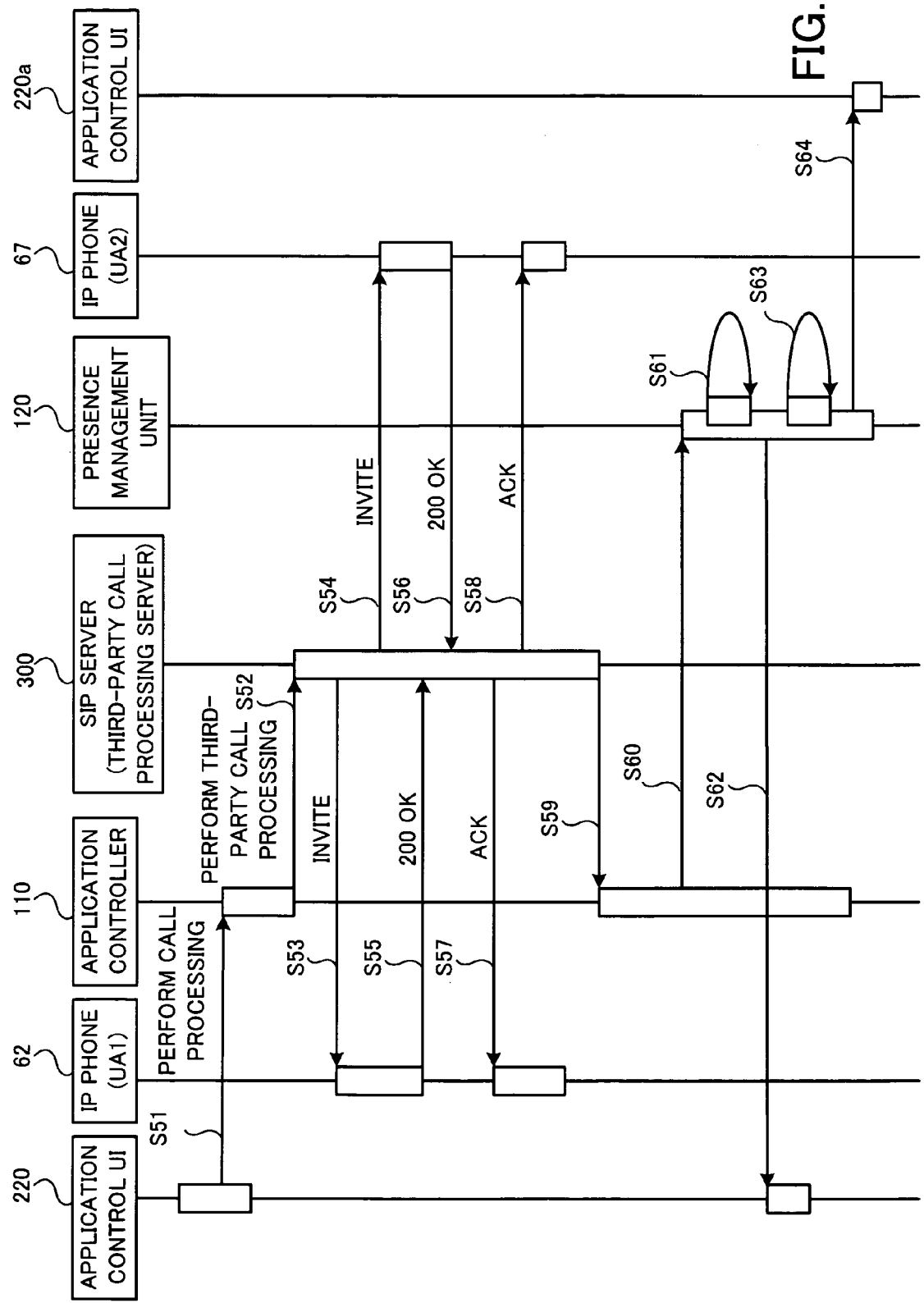
FIG. 12 shows a processing sequence in a collaboration addition phase using an IP phone.

FIG. 12 shows a processing sequence in the collaboration tool addition phase using the IP phone.

First, when the user A selects the IP phone 62 from communication tools displayed on the communication tool environment screen 16, the application control UI 220 executes call processing to the application controller 110 (step S51).

Next, the application controller 110 executes a third-party call request to thereby call up an API of a third-party call request server within the SIP server 300 (step S52).

Next, the SIP signaling processing is performed (steps S53 to S58). Specifically, the SIP server 300 first transmits a connection request (INVITE) to the UA1 (step S53) and then transmits a connection request (INVITE) to the UA2 (step S54).

The UA1, when receiving the INVITE, returns to the SIP server 300 a success response (200 OK) to the INVITE (step S55). Further, the UA2, when receiving the INVITE, returns to the SIP server 300 a success response (200 OK) to the INVITE (step S56).

Next, the SIP server 300 transmits an ACK response to each of the UA1 and the UA2 based on the success responses from the UA1 and the UA2 (steps S57 and S58).

Next, the SIP server 300 reports a call event to the application controller 110 (step S59).

Next, the application controller 110 causes the presence management unit 120 to update the presence information. Then, the unit 120 reports the presence information to the UA1 and the UA2 (steps S60 to S64). The operations are the same as those in steps S28 to S32 of FIG. 10. Therefore, the description is omitted.

Next, a processing sequence (processing operation) in the collaboration tool addition phase will be described by taking as an example a case of performing file transmission.

Figure 13:
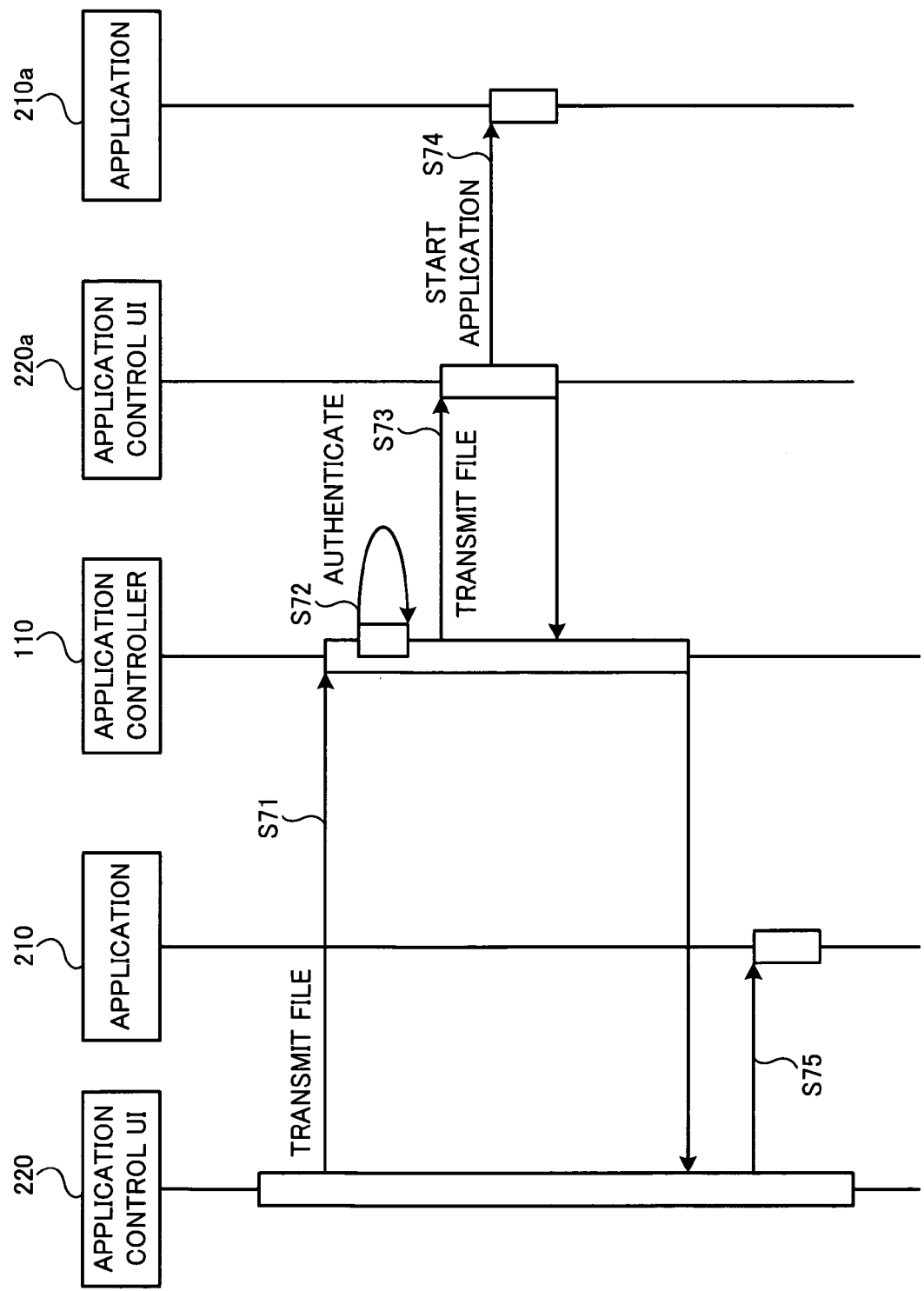
FIG. 13 shows a processing sequence in a collaboration addition phase in the case of performing a file transmission.

FIG. 13 shows a processing sequence in the collaboration tool addition phase in the case of performing the file transmission.

First, when the user A selects a file transmission from the communication tools displayed on the communication tool environment screen 16, the application control UI 220 transmits a file to the application controller 110 (step S71).

Next, the application controller 110 performs authentication (step S72). When the user A is authenticated, the controller 110 transmits the file to the application control UI 220*a* of the client 201 (step S73).

Next, the application control UI 220*a* transmits an application start command to the application 210*a* (step S74). Thus, the UI 220*a* starts the application 210*a* corresponding to the transmitted file.

On the other hand, when the user A adds an option of requesting sharing of files in step S71, the application control UI 220 starts the application 210 corresponding to the transmitted file (step S75).

As described above, according to the communication system 500, the presence information on the communication tools used by users is collected into the presence management unit 120 through the local application information management unit 230 of the client, the SIP server 300 and the IM server 400. Further, when a session using any one of the communication tools is established between the user A and the user B, mutual presence information is transmitted to the application control UI 220 of the client 200 used by the communicating user A and the application control UI 220*a* of the client 200*a* used by the communicating user B. The presence information includes information such as an IP address or a user ID necessary for performing collaboration with a partner. Therefore, when operating the application control UI 220, the user A can easily and surely perform the collaboration without confirming the IP address or the user ID to a partner as well as without manually inputting directly the IP address or the user ID. As a result, the user A can perform the collaboration smoothly and effectively.

In the present embodiment, when using an e-mail as the communication tool, the user A registers the presence information in the user profile table 151; however, the present embodiment is not limited thereto. For example, a programmable mail server such as Apache James (Java Apache Mail Enterprise Server) may be used to obtain the presence information using the same mechanism as that in the VoIP or the IM. Alternatively, a plug-in for registering the presence information may be incorporated into a mail application.

Further, in the present embodiment, the SIP server 300 and the IM server 400 have a function of externally reporting the event or presence information on the VoIP or IM. However, the present embodiment is not limited thereto. The communication media 60 and 65 (SIP terminal sides) may have a function of reporting the event or presence information. In this case, the SIP server 300 and the IM server 400 are not required to have a function of externally reporting the event or presence information.

Next, a second embodiment of the communication system will be described.

FIG. 14 is a block diagram showing a system according to the second embodiment.

Hereinafter, the communication system 500*a* according to the second embodiment will be described by focusing attention on the difference from the above-described first embodiment, and an explanation of the same matters as in the first embodiment will be omitted.

In the collaboration tool addition phase of the first embodiment, a communication tool is selected by a user. However, in the collaboration tool addition phase of the second embodiment, a communication tool to be used is selected based on preference information about position information of the communication tool or terminal type information for finely classifying the media type. In this regard, the collaboration tool addition phase of the second embodiment is different from that of the first embodiment.

The communication system 500*a* according to the second embodiment comprises a server 100*a* further including a preference management unit 170 which receives a preference management request and a preference database 180 which stores the management data, a client 200*a* further including a preference operation UI 260 which executes a preference management request, and a client 201*a* further including a preference operation UI 260*a* which executes a preference management request.

FIG. 15 shows a user profile table according to the second embodiment.

In the user profile table 151*a*, columns (attributes) of the terminal type and the position are added as compared with the user profile table 151.

The above-described information is set, for example, using the profile operation UI 240 operated by the user A.

In the column of the terminal type, a type of the communication tool is set. For example, "mobile" is set in a case of the mobile-phone 61, "fixed" is set in a case of the fixed IP phone 62, and "soft" is set in a case of the softphone 63.

In the column of the position, the position information is set for the communication tool having neither media type "collabo" nor terminal type "voip".

Specifically, for the communication tool having a terminal type of "soft" or "fixed", the media ID of the client 200 with a closest positional relation is set. Accordingly, for the softphone 63, the media ID "foo@pc1" of the client 200 having installed therein software of the softphone 63 is set. For the fixed IP phone 62, the media ID "foo@pc1" of the client 200 is set. For an e-mail of the mobile-phone 61, the media ID "sip:foo@mobile.\*\*\*.com" of the mobile-phone is set.

Further, when the user A can use a client different from the client 200, the media ID (foo@pc2 in FIG. 15) of the client can also be set.

Further, using the preference operation UI 260, the user A accesses the preference management unit 170 of the server 100*a* and previously registers on the preference database 180 a priority of the communication tool. The information is, for example, tabulated and stored.

FIG. 16 shows a preference table.

The preference table 181 has the columns of the user ID and the preference. The laterally arranged items in the respective columns are associated with each other.

In the column of the preference for the user ID "foo" in FIG. 16, "mobile", "fixed" and "soft" are set in the order of descending priorities.

Further, in the case where the media type "voip" is selected, for example, in the collaboration tool addition phase, the call processing (step S51) in FIG. 12 is performed as follows. That is, the application controller 110 refers to the profile table 151a, the presence table 131 and the preference table 181 and searches for the VoIP terminals with the same position as that of the client. Further, from the found VoIP terminals, the controller 110 selects a terminal having the presence state of "open" and having the highest priority to perform a call request.

Next, the collaboration tool addition phase according to the second embodiment will be described in detail by taking as an example a case of using the IP phone 62.

In the collaboration tool addition phase according to the second embodiment, the same processing as in the first embodiment is performed for the operations in steps S52 to S64 shown in FIG. 12. Further, the following operations are performed immediately after step S51 to determine an appropriate call destination.

Figure 17:
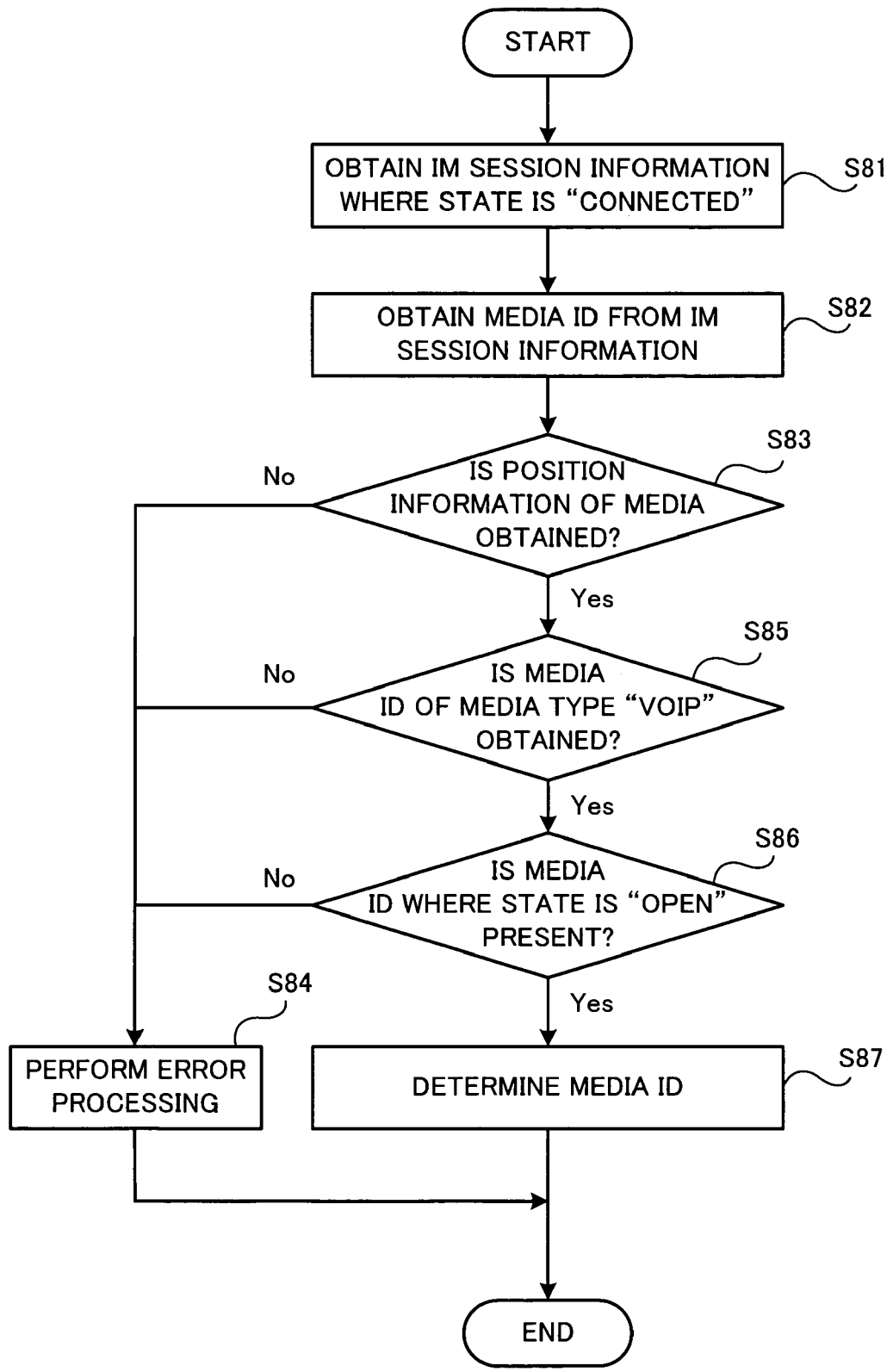
FIG. 17 is a flowchart for illustrating a processing sequence in a collaboration addition phase according to a second embodiment.

FIG. 17 is a flowchart for illustrating a processing sequence in the collaboration tool addition phase according to the second embodiment.

First, the application controller 110 obtains IM session information where the present state is "connected" (step S81).

Next, the application controller 110 obtains the media ID from the IM session information (step S82).

Next, the application controller 110 instructs the profile management unit 140 to take out the user profile table 151a and determines the acquisition of position information of the media (step S83).

When obtaining no position information of the media (step S83; No), the controller 110 performs a predetermined error processing of, for example, reporting the error to the monitor 11 and then completes the determination operation (step S84). On the other hand, when obtaining the position information of the media (step S83; Yes), the controller 110 determines the acquisition of the communication tools with the media type "voip" having the same position information (step S85). When obtaining no communication tool (step S85; No), the controller 110 moves to step S84 to perform predetermined error processing and then completes the determination operation. On the other hand, when obtaining the communication tools (step S85; Yes), the controller 110 requires a list of the communication tool having the present state of "open" from among the obtained communication tools (step S86). When the communication tool having the present state of "open" is absent (step S86; No), the controller 110 moves to step S84 to perform predetermined error processing and then completes the operation. On the other hand, when the communication tool having the present state of "open" is present (step S86; Yes), the controller 110 refers to the preference information and determines a communication tool as a call destination (step S87).

With that, the processing sequence in the collaboration tool addition phase according to the second embodiment is completed.

According to the communication system 500a of the second embodiment, the same effect as that in the communication system 500 of the first embodiment is obtained.

Further, according to the communication system 500a of the second embodiment, when previously setting the priority of the communication tools in the preference table 181, the user A can perform the collaboration using a desired terminal. Specifically, for example, when a collaboration request from the user B to the user A is made by telephone, the user A allows the request to arrive at a desired terminal of the mobile-phone 61, the fixed IP phone 62 and the softphone 63.

Next, a third embodiment of the communication system will be described.

In the third embodiment, the collaboration is performed by a method capable of making the maximum use of the communications environments relating to both the clients 200 and 201 who perform the collaboration with each other. More specifically, depending on the communications environments relating to each of the clients 200 and 201, when application sharing is permitted, the application sharing is performed, whereas when application sharing is not permitted, a file transmission is performed as one example of alternatives for the application sharing. Further, in the file transmission, when the client 201 cannot display a file transmitted from the client 200, a format of the file is converted into that allowing the client 201 to display the file and then the file is transmitted to the client 201.

Figure 18:
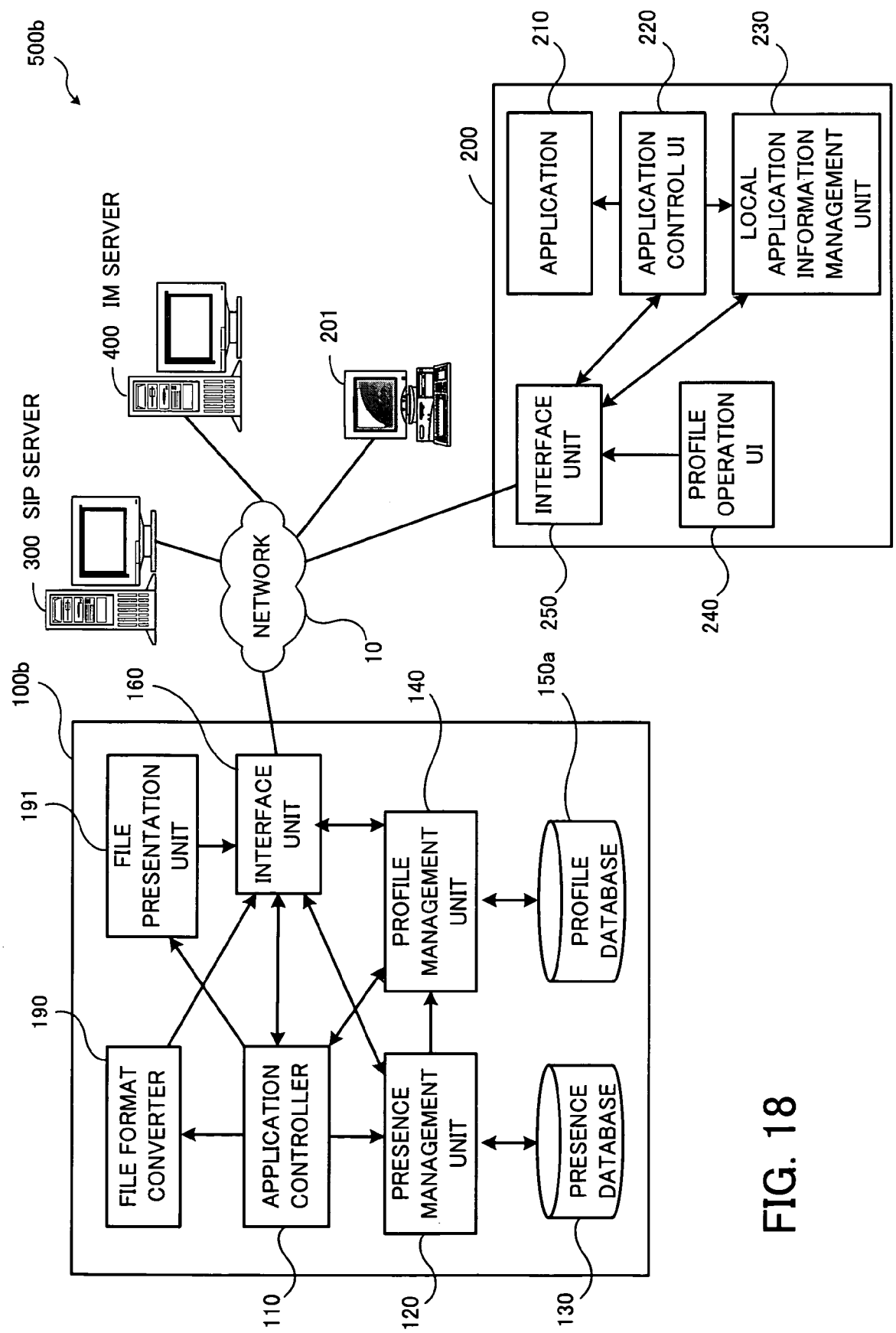
FIG. 18 is a block diagram showing a system according to a third embodiment.

FIG. 18 is a block diagram showing a system according to a third embodiment.

Hereinafter, the communication system 500b according to the third embodiment will be described by focusing attention on the difference from the above-described first embodiment, and an explanation of the same matters as in the first embodiment will be omitted.

The communication system 500b comprises a server 100b further including a file format converter 190, a profile database 150a having an application data profile table where a file format conversion rule is tabulated, and a file presentation unit 191.

The file format converter 190 converts a format of a file inputted in response to the instruction of the application controller 110 and transmits the converted file to the application control UI 220.

Figure 19:
FIG. 19 shows an application data profile table.

FIG. 19 shows an application data profile table.

The application data profile table 152 has the columns of an application type and a conversion method. Further, the conversion method is split into the respective items of a target type and a program. The laterally arranged items in the respective columns are associated with each other.

In the column of the application type, an extension of the file is set.

In the column of the target type, an extension of the file into which an extension of an application type is converted is set.

In the column of the program, a storage destination of the program for converting the extension into an extension of the target type is set.

Returning again to FIG. 18, the description will be given.

The file presentation unit 191 has a function, when being presented with a file from the application controller 110, of converting the presented file into that in Hyper Text Markup Language (HTML) format and holding the converted file. Further, the file presentation unit 191 has a function of a Web server. Therefore, the unit 191 reads the presented file using a browser and then transmits to the client 201 a URL for accessing the file.

Next, a processing sequence in the collaboration tool addition phase according to the third embodiment will be described.

Hereinafter, a case of performing the application sharing when the collaboration is established will be described.

Figure 20:
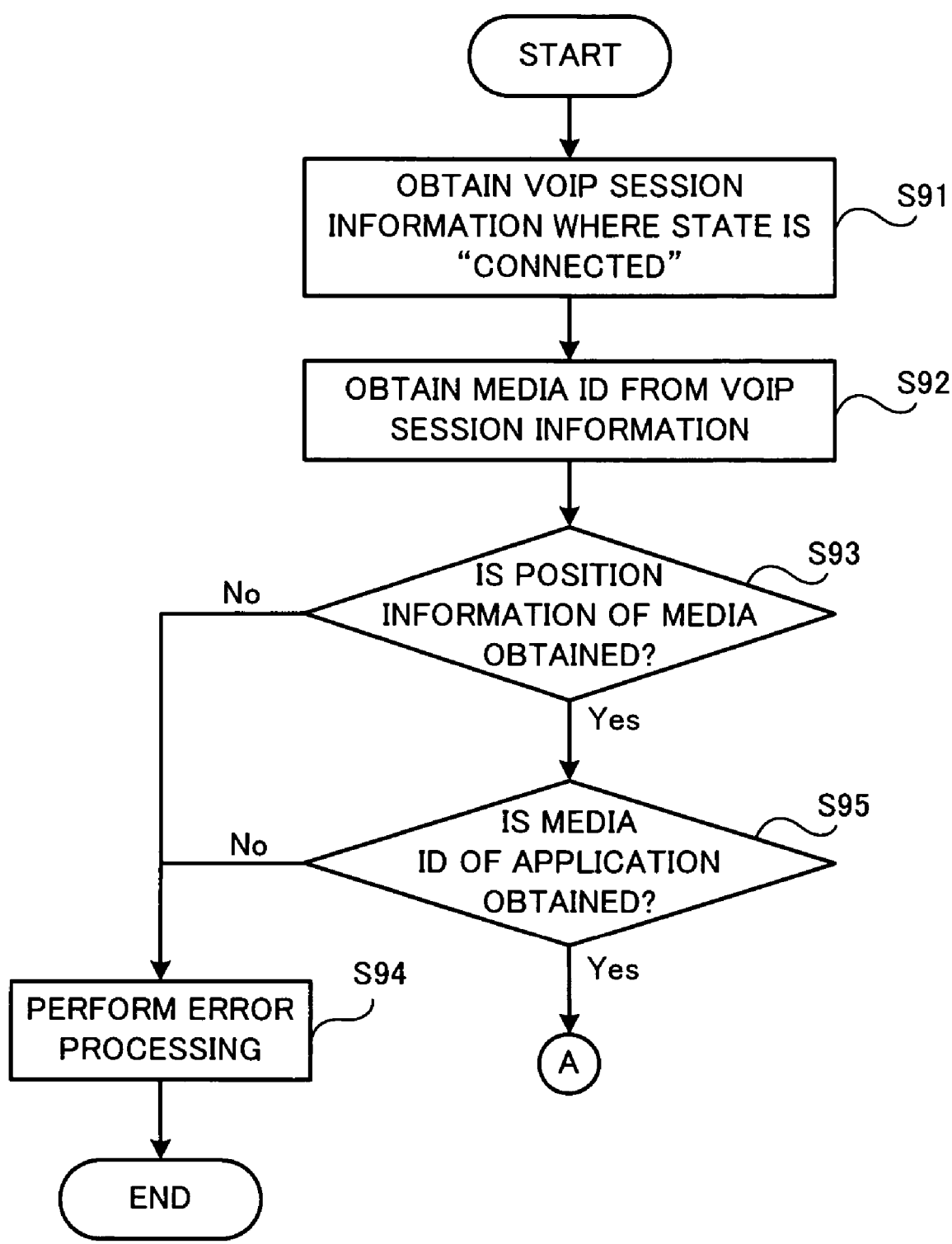
FIG. 20 is a flowchart for illustrating a processing sequence in a collaboration addition phase according to a third embodiment.
Figure 21:
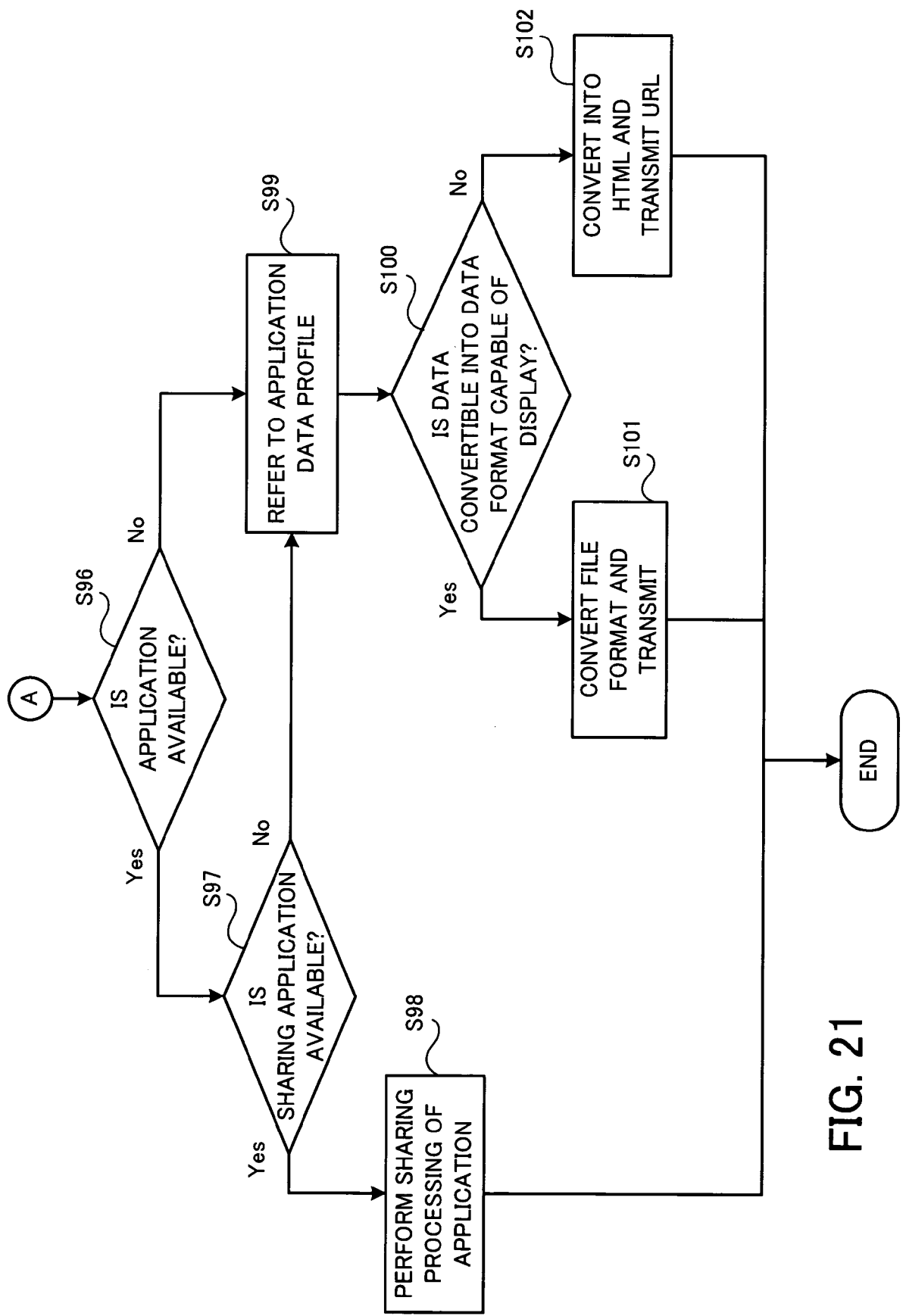
FIG. 21 is a flowchart for illustrating a processing sequence in a collaboration addition phase according to a third embodiment.

FIGS. 20 and 21 are flowcharts for illustrating the processing sequence in the collaboration tool addition phase according to the third embodiment.

When the user A selects the application sharing from the client 200, first, the application controller 110 obtains VoIP session information where the present state is "connected" (step S91).

Next, the application controller 110 obtains the media ID from the VoIP session information (step S92).

Next, the application controller 110 instructs the profile management unit 140 to take out the user profile table 151a and determines the acquisition of position information of the media (step S93). When obtaining no position information of the media (step S93; No), the controller 110 performs predetermined error processing and then completes the determination operation (step S94). On the other hand, when obtaining the position information of the media (step S93; Yes), the controller 110 determines the acquisition of the media IDs of the application 210 having the same position information (step S95).

When obtaining no media ID of the application 210 (step S95; No), the controller 110 moves to step S94 to perform predetermined error processing and then completes the determination operation.

On the other hand, when obtaining the media ID of the application 210 (step S95; Yes), the application controller 110 refers to the presence database 130 and confirms whether the application of the data desirable to be shared is available, namely, whether the present state is "installed" (step S96 in FIG. 21). When the application of the data desirable to be shared is available (step S96; Yes), the controller 110 confirms whether the sharing application (e.g., an application with a messenger function) for sharing the application of the data desirable to be shared is available (step S97). When the sharing application is available (step S97; Yes), the controller 110 performs sharing processing using the sharing application (step S98) and then completes the determination operation. Further, when the sharing application is not available (step S97; No), the controller 110 moves to step S99.

On the other hand, when the application of the data desirable to be shared is not available (step S96; No), the application controller 110 refers to the application data profile table 152 (step S99).

Next, the application controller 110 confirms whether the data desirable to be shared is convertible into that in a data format capable of display in the environment of the client as a partner (step S100).

When the data desirable to be shared is convertible (step S100; Yes), the application controller 110 transmits the data to the file format converter 190 and the file format converter 190 performs the file format conversion as well as the transmission processing (step S101). Then, the controller 110 completes the determination operation. Further, when the data desirable to be shared is not convertible (step S100; No), the controller 110 transmits the data to the file presentation unit 191. Further, the unit 191 subjects the data to HTML conversion and transmits a URL of the data to the client 201 (step S102).

Thus, the application control UI 220a which receives the URL starts a browser to display a document with the received URL.

With that, the collaboration tool addition phase according to the third embodiment is completed.

According to the communication system 500b of the third embodiment, the same effect as that in the communication system 500 of the first embodiment is obtained.

Unless an application having an application sharing function is installed on a personal computer of a user, application sharing cannot be performed. However, according to the communication system 500b of the third embodiment, by performing the file transmission, the objective information sharing can be attained.

Next, a fourth embodiment of the communication system will be described.

In the first to third embodiments, the communication media 60 and the application 210 are targeted as the collaboration tool. However, in the fourth embodiment, other devices or services connected to the network 10 are also used as the collaboration tool. In this regard, the fourth embodiment is different from the first to third embodiments.

Hereinafter, the communication system according to the fourth embodiment will be described by focusing attention on the difference from the above-described first embodiment, and an explanation of the same matters as in the first embodiment will be omitted.

In the communication system of the fourth embodiment, the local application information management unit 230 has a Universal Plug and Play (UPnP) function.

The unit 230 finds a communication tool within the same segment in accordance with the UPnP protocol and stores (registers) in the presence database 130 the obtained information as the presence information. In the storage of the information, setting in the columns of the present information and time stamp of the presence table 131 is performed in the same manner as in the first embodiment. Further, a URL of the UPnP action is set in the column of the media ID, the "upnp/(device type of service)" is set in the column of the media type, a parameter necessary for an action is set in the column of the state option, and a URL of the UPnP action is set in the column of the contact in the same manner as in the media ID.

Further, in the same manner as in the first embodiment, the session is established and then the presence information is reported. Thereafter, when the UPnP service is selected as the communication tool, the URL of the UPnP action is called to perform the UPnP service.

According to the communication system of the fourth embodiment, the same effect as that in the communication system 500 of the first embodiment is obtained.

Further, according to the communication system of the fourth embodiment, the collaboration can be realized by a method capable of further making the maximum use of the computer environments of both the clients 200 and 201. More specifically, in place of performing the file transmission as an alternative for the application sharing as described in the third embodiment, when a printer corresponding to the UPnP is found, the file is printed to allow the sharing of the information.

In the present embodiment, the UPnP function is used as a control point function; however, the present invention is not limited thereto.

Next, a fifth embodiment of the communication system will be described.

Hereinafter, the communication system 500c according to the fifth embodiment will be described by focusing attention on the difference from the above-described first to fourth embodiments, and an explanation of the same matters as in the first to fourth embodiments will be omitted.

In the first to fourth embodiments, when the session is established, the server 100 reports the presence information of the user B to the client 200 as well as reports the presence information of the user A to the client 201. In the fifth embodiment, when the client requests the presence information, the server 100 reports the presence information of the user B to the client 200 as well as reports the presence information of the user A to the client 201.

Figure 22:
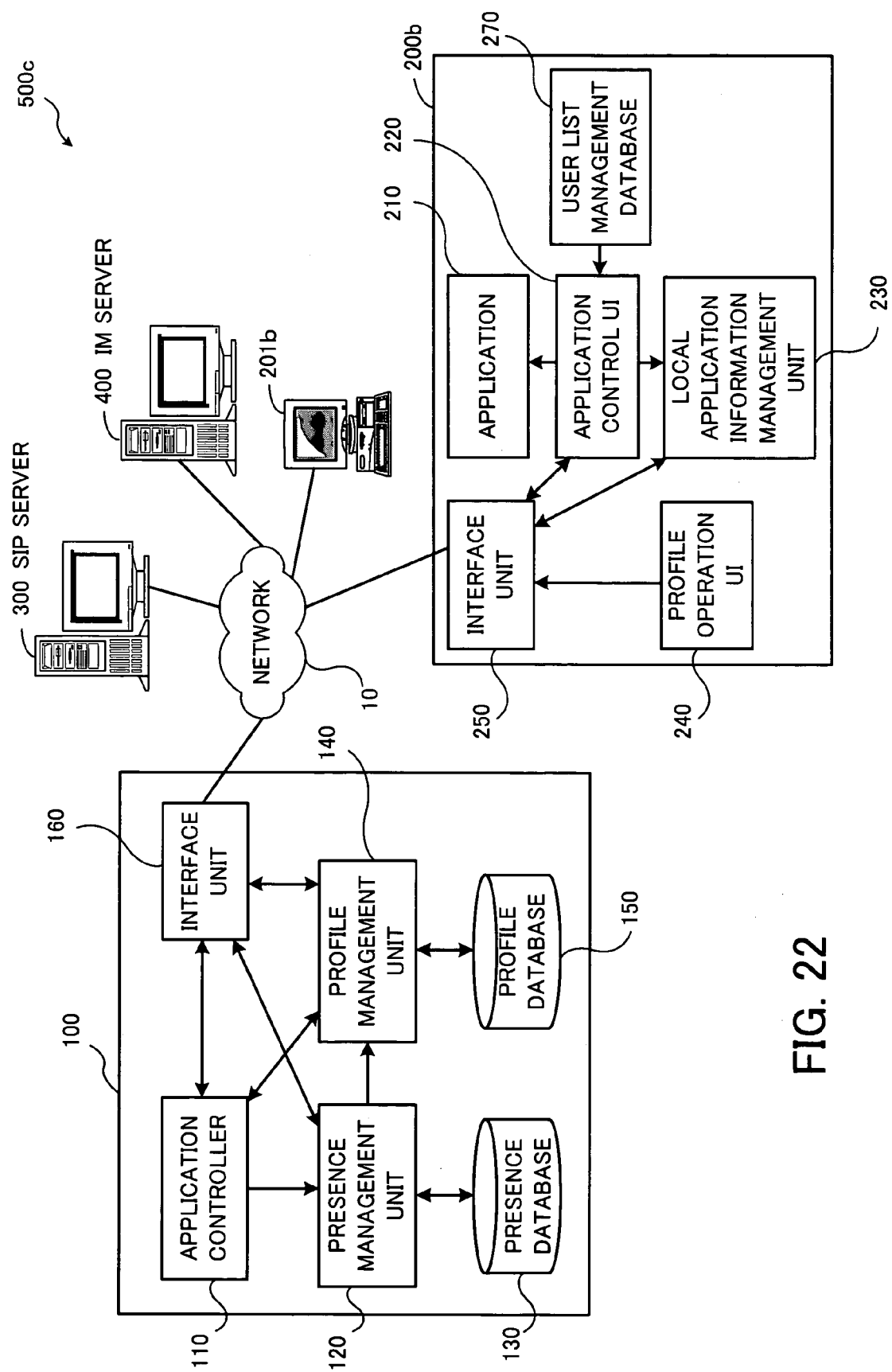
FIG. 22 is a block diagram showing a system according to a fifth embodiment.

FIG. 22 is a block diagram showing a system according to the fifth embodiment.

The clients 200b and 201b of the fifth embodiment further comprises user list management databases 270 and 270a having registered thereon users who perform the collaboration.

In the register on the user list, for example, the user A previously registers the user ID on the user list management database 270. Herein, the user list may be managed by the server 100, or a user may manually input the user ID directly.

The application control UI 220 displays the user list management database 270 on the operation screen 11a as preprocessing for starting the collaboration. When the user A specifies a user who performs the collaboration with the user A, the application control UI 220 requests the presence information from the presence management unit 120. Alternatively, the control UI 220 may previously read the presence information as in the buddy list (user list). Further, when obtaining the presence information, the application control UI 220 displays on the operation screen 11a a communication tool available to the user A and the user B.

Figure 23:
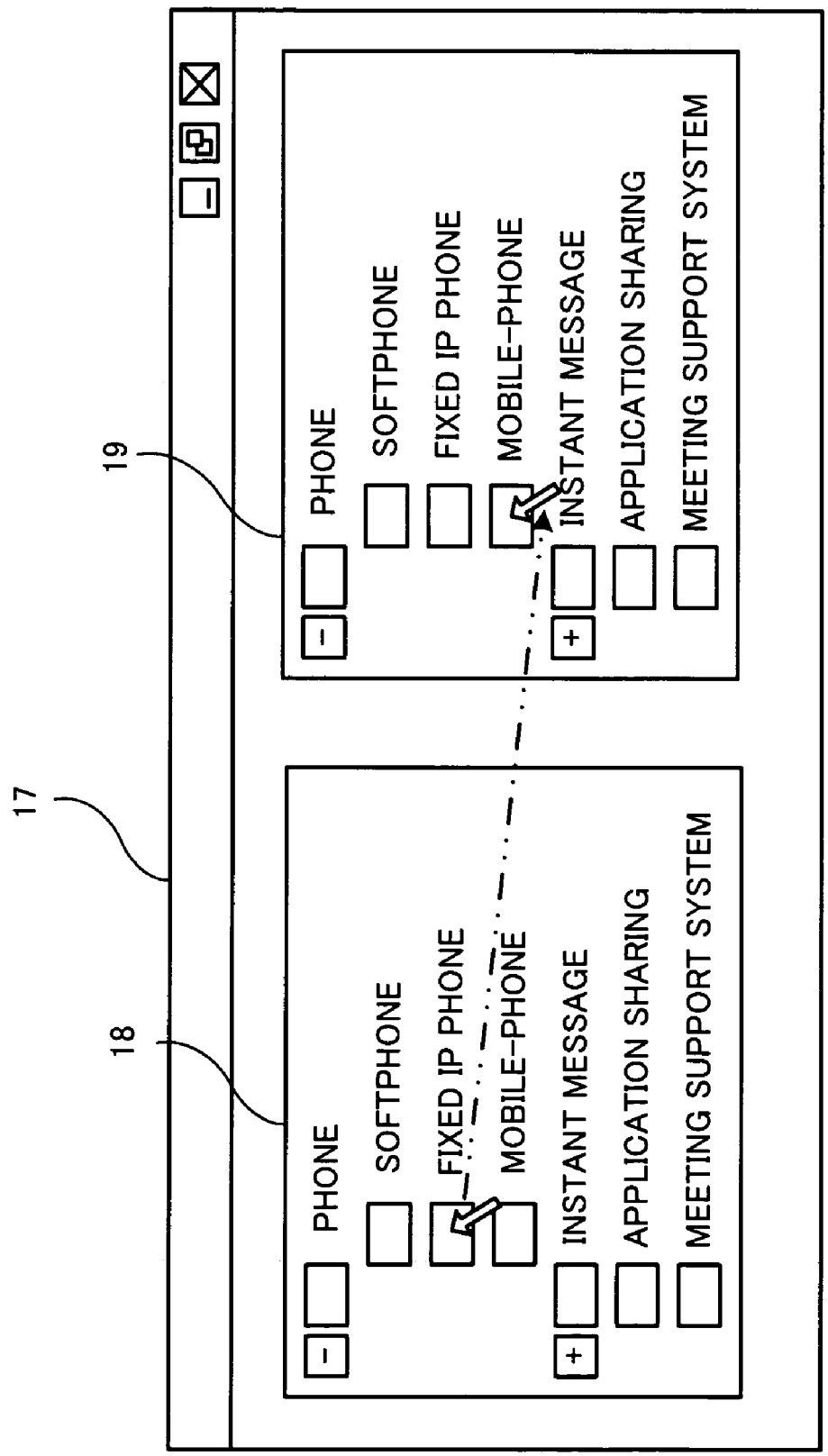
FIG. 23 shows an operation screen of an application control UI according to a fifth embodiment.

FIG. 23 shows the communication tool environment screen displayed on the operation screen.

The communication tool environment screen 17 displayed on the operation screen 11a has a communication tool group 18 of the user A and a communication tool group 19 of the user B.

By specifying, for example, using a mouse 13 a communication tool (fixed IP phone in FIG. 23) of the user A and a communication tool (mobile-phone in FIG. 23) of the user B who the user A desires to perform the collaboration with, the user A starts the collaboration.

According to the communication system 500c of the fifth embodiment, the same effect as that in the communication system 500 of the first embodiment is obtained.

Further, according to the communication system 500c of the fifth embodiment, the collaboration can be more easily attained.

In the above-described respective embodiments, communication examples between the user A and the user B (between the clients 200 and 201) are described. However, the present invention is not limited thereto. The collaboration among a plurality of users (among three or more clients) can also be performed.

Further, the processing functions of the server 100 and the clients 200 and 201 can be realized by computers (by allowing computers to execute a predetermined communication program). In this case, there is provided a program having described therein the processing contents of the functions to be owned by the server 100 and the clients 200 and 201. By allowing computers to execute the program, the processing functions can be realized by the computers. The program having described therein the processing contents can be recorded on the computer-readable recording medium. Examples of the computer-readable recording medium include a magnetic recording system, an optical disk, a magnetooptical medium and a semiconductor memory. Examples of the magnetic recording system include a hard disk drive (HDD), a floppy disk (FD) and a magnetic tape. Examples of the optical disk include a digital versatile disc (DVD), a digital versatile disc-random access memory (DVD-RAM), a compact disc-read only memory (CD-ROM) and a compact disc-recordable/rewritable (CD-R/RW). Examples of the magnetooptical medium include a magneto-optical disk (MO).

In the case of distributing programs, portable recording media such as a DVD and CD-ROM having recorded therein the program are sold. Further, the program may be stored in a storage device of a server computer to allow it to be transferred to other computer from the server computer through the network.

A computer which executes a communication program stores in its own storage device, for example, a program recorded on a portable recording medium or a program transferred from a server computer. Further, the computer reads a program from its own storage device to execute processing on the basis of the program. Further, the computer can directly read a program from the portable recording medium to execute processing on the basis of the program. Further, the computer, every when a program is transferred from the server computer, can sequentially execute processing on the basis of the received program.

According to the present invention, when a session using any one of communication units is established between users, the mutual presence information is reported to the client terminals of the users where the session is established. Therefore, a collaboration using a desired communication unit can be easily and surely realized without confirming IP addresses or user IDs with partners. As a result, efficiency of the collaboration can be attained.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium which records a communication program for performing collaboration between client terminals using a plurality of types of communication means having device type information and user identification information, the program allowing a computer to serve as:

profile management means which manages, for each user, specific information including a combination of the device type information and the user identification information in each of the communication means, and a user ID associated with the combined information;

application control means which, when a session using any one of the communication means is established between users, refers to the specific information managed by the profile management means and associates the user ID with the combination of the device type information and the user identification information in each of the communication means where the session is established;

collection means which collects presence information where state information indicating whether the communication means is available is associated with the combination of the device type information and the user identification information in each of the communication means;

presence management means which, when the user ID is specified by the application control means, refers to the presence information and reports the presence information indicating available communication means of a communication partner to the client terminals of the users having the established session; and preference management means which manages priority information of the communication means, wherein:

the application control means, when a use request for using available communication means of the communication partner is made by the client terminal of the user during establishment of the session, allows the client terminal of the communication partner to perform in response to the use request processing corresponding to the use request;

the specific information further includes position information indicating a positional relation between the each communication means and the client terminal; and the application control means, when there are a plurality of device type information having same position information in association with the user ID of the user having the established session, allows the client terminal of the communication partner to perform the corresponding processing based on the priority information.

2. The computer-readable recording medium according to claim 1, wherein:

the application control means, when a data communication request using the communication means is made by the client terminal of a user during establishment of the session, determines whether the client terminal of a communication partner during establishment of the session can use the communication means; and transmits, when the client terminal of the communication partner cannot perform execution of the communication means, the data to the client terminal of the communication partner using an alternative.

3. The computer-readable recording medium according to claim 2, wherein:

the alternative has file format conversion means for converting a file format; and when the client terminal of the communication partner cannot perform execution of the communication means, the file format conversion means converts the data into in a predetermined file format and transmits the converted data to the client terminal of the communication partner.

4. The computer-readable recording medium according to claim 2, wherein:

the alternative has HTML conversion means for converting a file format into an HTML format; and when the client terminal of the communication partner cannot perform execution of the communication means, the HTML conversion means converts the data into in the HTML format and transmits a URL in the HTML format to the client terminal of the communication partner.

5. The computer-readable recording medium according to claim 1, wherein the collection means collects the presence information in the communication means within the same segment of the client terminal.

6. The computer-readable recording medium according to claim 1, wherein the communication means has an IP address.

7. The computer-readable recording medium according to claim 1, wherein the collection means, when the communication means uses a session-start protocol, obtains the presence information from a session-start protocol server.

8. The recording medium according to claim 1, wherein the presence management means, when reporting the presence information to the communication partner, reports the presence information of the user.

9. A communication method for performing collaboration between client terminals using a plurality of types of communication means having device type information and user identification information, the method comprising the steps of:

managing, for each user, specific information including a combination of the device type information and the user identification information in each of the communication means, and a user ID associated with the combined information;

referring to, when a session using any one of the communication means is established between users, the specific information and associating the user ID with the combination of the device type information and the user identification information in each of the communication means where the session is established;

collecting presence information where state information indicating whether the communication means is available is associated with the combination of the device type information and the user identification information in each of the communication means;

referring to, when the user ID is specified, the presence information and reporting the presence information indicating available communication means of a communication partner to the client terminals of the users having the established session; and managing priority information of the communication means, wherein:

when a use request for using available communication means of the communication partner is made by the client terminal of the user during establishment of the session, the client terminal of the communication partner is allowed to perform in response to the use request processing corresponding to the use request;

the specific information further includes position information indicating a positional relation between each communication means and the client terminal; and when there are a plurality of device type information having same position information in association with the user ID of the user having the established session, the client terminal of the communication partner is allowed to perform the corresponding processing based on the priority information.

10. A communication apparatus for performing collaboration between client terminals using a plurality of types of communication means having device type information and user identification information, the apparatus comprising:

profile management means which manages, for each user, specific information including a combination of the device type information and the user identification information in each of the communication means, and a user ID associated with the combined information;

application control means which, when a session using any one of the communication means is established between users, refers to the specific information managed by the profile management means and associates the user ID with the combination of the device type information and the user identification information in each of the communication means where the session is established;

collection means which collects presence information where state information indicating whether the communication means is available is associated with the combination of the device type information and the user identification information in each of the communication means;

presence management means which, when the user ID is specified by the application control means, refers to the presence information and reports the presence information indicating available communication means of a communication partner to the client terminals of the users having the established session; and preference management means which manages priority information of the communication means, wherein:

the application control means, when a use request for using available communication means of the communication partner is made by the client terminal of the user during establishment of the session, allowing the client terminal of the communication partner to perform in response to the use request processing corresponding to the use request;

the specific information further includes position information indicating a positional relation between the each communication means and the client terminal; and the application control means, when there are a plurality of device type information having same position information in association with the user ID of the user having the established session, allows the client terminal of the communication partner to perform the corresponding processing based on the priority information.

* * * * *